(12) United States Patent
Asanaka

(10) Patent No.: US 8,880,575 B2
(45) Date of Patent: Nov. 4, 2014

(54) FAST FOURIER TRANSFORM USING A SMALL CAPACITY MEMORY

(75) Inventor: Kazunori Asanaka, Yokohama (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 349 days.

(21) Appl. No.: 13/514,334

(22) PCT Filed: Dec. 16, 2009

(86) PCT No.: PCT/JP2009/071357
§ 371 (c)(1),
(2), (4) Date: Jun. 7, 2012

(87) PCT Pub. No.: WO2011/074128
PCT Pub. Date: Jun. 23, 2011

(65) Prior Publication Data
US 2012/0254273 A1  Oct. 4, 2012

(51) Int. Cl.
*G06F 17/14* (2006.01)
(52) U.S. Cl.
CPC .................... *G06F 17/142* (2013.01)
USPC .......................... 708/404; 708/409
(58) Field of Classification Search
None
See application file for complete search history.

(56) References Cited

U.S. PATENT DOCUMENTS

| 4,138,730 | A | * | 2/1979 | Ali ............................ 708/404 |
| 4,723,258 | A | | 2/1988 | Tanaka et al. |
| 5,091,875 | A | * | 2/1992 | Wong et al. .................. 708/404 |
| 5,293,330 | A | * | 3/1994 | Sayegh ........................ 708/406 |
| 6,081,821 | A | * | 6/2000 | Hopkinson et al. ............ 708/406 |
| 6,434,583 | B1 | * | 8/2002 | Dapper et al. ................ 708/409 |
| 2007/0106718 | A1 | | 5/2007 | Shum et al. |

FOREIGN PATENT DOCUMENTS

| JP | 62-1030 A | 1/1987 |
| JP | 62-150466 A | 7/1987 |
| JP | 11-161637 A | 6/1999 |
| JP | 2008-186396 A | 8/2008 |
| JP | 2008-217359 A | 9/2008 |

* cited by examiner

*Primary Examiner* — Michael D Yaary
(74) *Attorney, Agent, or Firm* — Coats & Bennett, PLLC

(57) ABSTRACT

The present invention provides technologies for implementing a high-speed Fast Fourier Transform (FFT) algorithm with a small memory. An information processing apparatus for performing a radix-2 FFT on a data sequence comprises storage means, reading means, a plurality of butterfly operation means, writing means, and control means, wherein each stage of the FFT operation includes a plurality of operation steps, and at every operation step the control means controls each of the means so that: the reading means reads from the storage means sets of data elements referred by storage addresses A, A+1, A+$2^m$, and A+$2^m$+1, the plurality of butterfly operation means perform radix-2 butterfly operation on the data elements in the sets, and the writing means writes the sets of the result data into the storage area referred by the storage addresses A, A+1, A+$2^m$, and A+$2^m$+1.

7 Claims, 40 Drawing Sheets

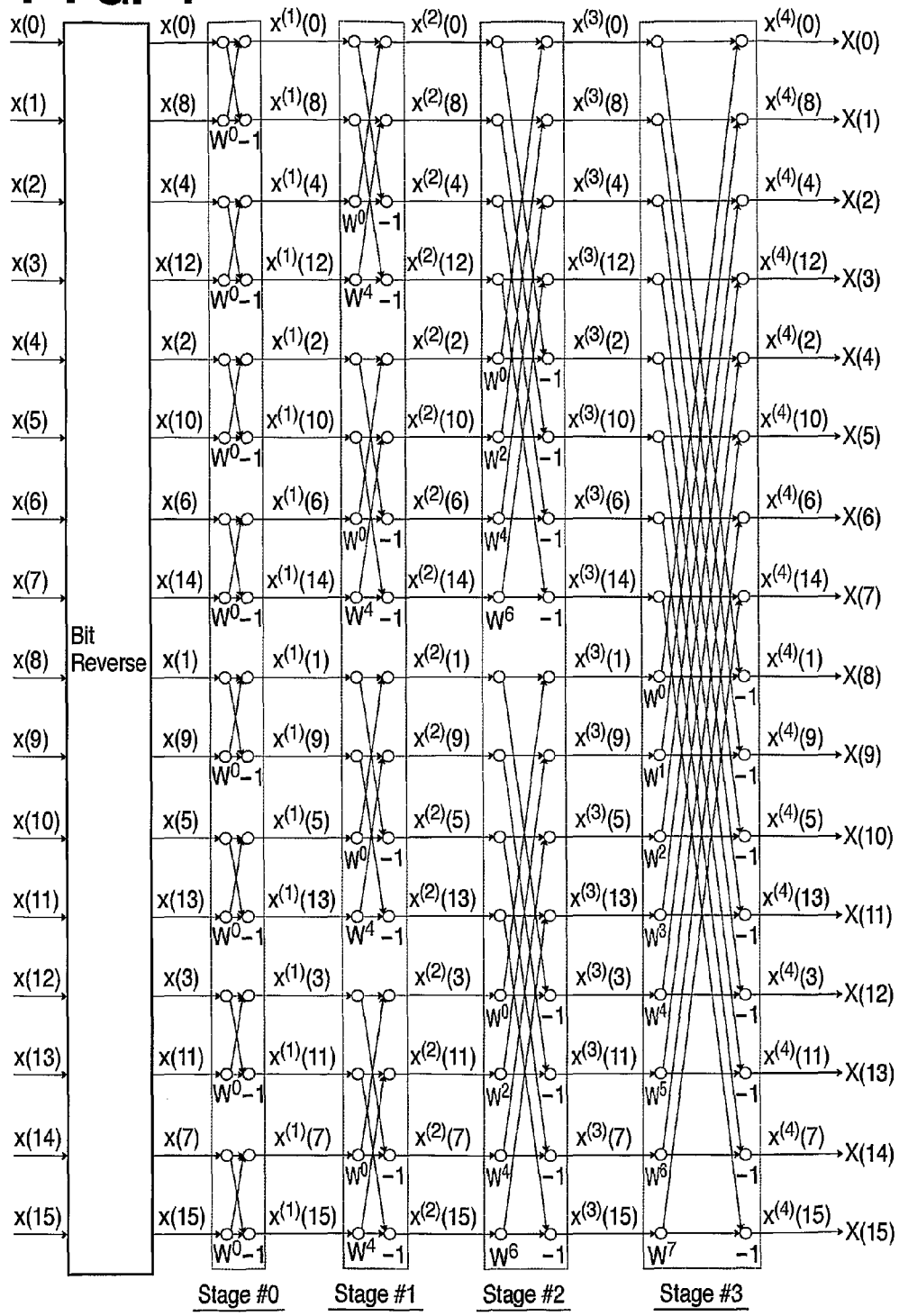
F I G. 1

FIG. 7

| | DIT (Standard) | DIF (Standard) | DIF (Bit-reverse at first) |
|---|---|---|---|
| Stage #0 | $W^0$ | $W^0, W^1, W^2, W^3, W^4, W^5, W^6, W^7$ | $W^0, W^4, W^2, W^6, W^1, W^5, W^3, W^7$ |
| Stage #1 | $W^0, W^4$ | $W^0, W^2, W^4, W^6$ | $W^0, W^4, W^2, W^6$ |
| Stage #2 | $W^0, W^2, W^4, W^6$ | $W^0, W^4$ | $W^0, W^4$ |
| Stage #3 | $W^0, W^1, W^2, W^3, W^4, W^5, W^6, W^7$ | $W^0$ | $W^0$ |
| Coefficient array | $W^0, W^1, W^2, W^3, W^4, W^5, W^6, W^7$ | $W^0, W^1, W^2, W^3, W^4, W^5, W^6, W^7$ | $W^0, W^4, W^2, W^6, W^1, W^5, W^3, W^7$ |

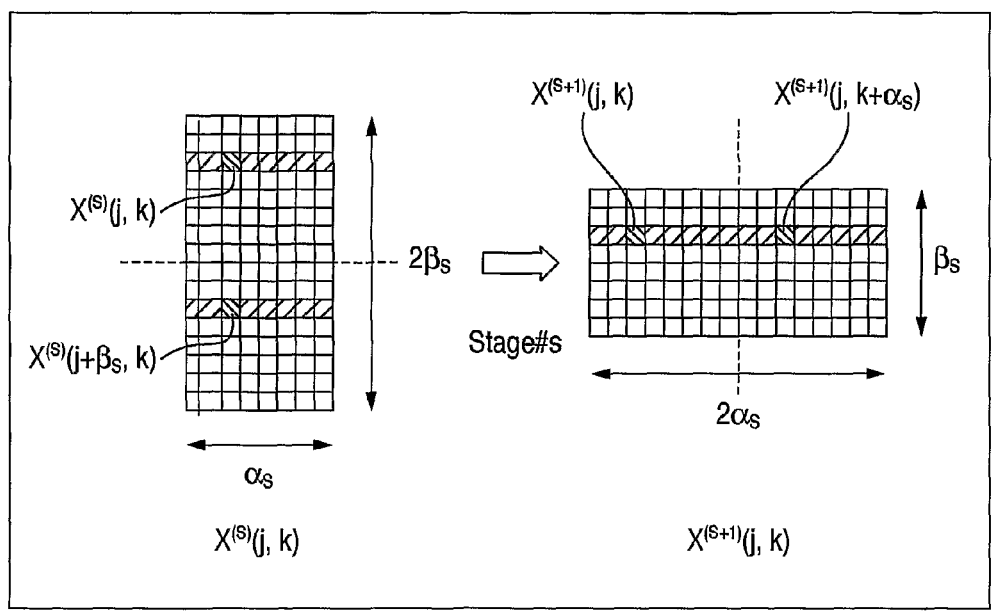
F I G. 10

FIG. 15

```
// R : Number of Stages
// Initializing as the target permutation pattern
for (i = 0 ; i<R ; i++) {
  P[i] = R-i-1;
} for (s=0 ; s<R ; s++) {
  // Searching ds from MSB and the position is given as f
  f = s ;
  for (i = R-1; i >= v ; i--) {
    if (P[i] == s) {
      f = i ;
      break ;
    }
  }
  if (v-1 >= s) {
    // Both inter and intra vector operation
    tmp = P[v] ;
    for (i = v-1 ; i >= s ; i--) {
      // Shift of partial address bits
      P[i+1] = P[i] ;
    }
    P[s] = P[f] ;
    P[f] = tmp ;
  } else if (f>s) {
    // Only inter vector operation
    tmp = P[s] ;
    P[s] = P[f] ;
    P[f] = tmp ;
  }
  output_bit_reverse_pattern (s, p) ;
}
```

FIG. 21

| Stage | Read Port A | Read Port B | Write Port P | Write Port Q | ROM Address | ROM Mode | Lane swap pattern |
|---|---|---|---|---|---|---|---|
| #0 | <0, $c_3$, $c_2$, $c_1$, $c_0$> | <1, $c_3$, $c_2$, $c_1$, $c_0$> | <$c_0$, $c_3$, $c_2$, $c_1$, 0> | <$c_0$, $c_3$, $c_2$, $c_1$, 1> | <0,0,0,0> | 3 | A |
| #1 | <$c_3$, 0, $c_2$, $c_1$, $c_0$> | <$c_3$, 1, $c_2$, $c_1$, $c_0$> | <$c_3$, $c_0$, $c_2$, $c_1$, 0> | <$c_3$, $c_0$, $c_2$, $c_1$, 1> | <$c_3$,0,0,0> | 3 | B |
| #2 | <$c_3$, $c_2$, 0, $c_1$, $c_0$> | <$c_3$, $c_2$, 1, $c_1$, $c_0$> | <$c_3$, $c_2$, $c_0$, $c_1$, 0> | <$c_3$, $c_2$, $c_0$, $c_1$, 1> | <$c_3$, $c_2$, 0,0> | 3 | C |
| #3 | <$c_3$, $c_2$, $c_1$, 0, $c_0$> | <$c_3$, $c_2$, $c_1$, 1, $c_0$> | <$c_3$, $c_2$, $c_1$, 0, $c_0$> | <$c_3$, $c_2$, $c_1$, 1, $c_0$> | <$c_3$, $c_2$, $c_1$, 0> | 3 | C |
| #4 | <0, $c_3$, $c_2$, $c_1$, $c_0$> | <1, $c_3$, $c_2$, $c_1$, $c_0$> | <$c_2$, $c_3$, 0, $c_1$, $c_0$> | <$c_2$, $c_3$, 1, $c_1$, $c_0$> | <$c_3$, $c_2$, $c_1$, $c_0$> | 3 | C |
| #5 | <$c_3$, 0, $c_2$, $c_1$, $c_0$> | <$c_3$, 1, $c_2$, $c_1$, $c_0$> | <$c_3$, 0, $c_2$, $c_1$, $c_0$> | <$c_3$, 1, $c_2$, $c_1$, $c_0$> | <$c_3$, $c_2$, $c_1$, $c_0$> | 2 | C |
| #6 | <0, $c_3$, $c_2$, $c_1$, $c_0$> | <1, $c_3$, $c_2$, $c_1$, $c_0$> | <0, $c_3$, $c_2$, $c_1$, $c_0$> | <1, $c_3$, $c_2$, $c_1$, $c_0$> | <$c_3$, $c_2$, $c_1$, $c_0$> | 1 | C |

FIG. 23

| Address (2301) | Data (2302) | | | | |
|---|---|---|---|---|---|
| | C(3) | C(2) | C(1) | C(0) | Mode=1 |
| | - | C(3)/C(2) | - | C(0)/C(1) | Mode=2 |
| | - | - | - | C(0)/C(1)/C(2)/C(3) | Mode=3 |
| 0 | W(3) | W(2) | W(1) | W(0) | |
| 1 | W(7) | W(6) | W(5) | W(4) | |
| 2 | W(11) | W(10) | W(9) | W(8) | |
| 3 | W(15) | W(14) | W(13) | W(12) | |
| 4 | W(19) | W(18) | W(17) | W(16) | |
| 5 | W(23) | W(22) | W(21) | W(20) | |
| 6 | W(27) | W(26) | W(25) | W(24) | |
| 7 | W(31) | W(30) | W(29) | W(28) | |
| 8 | W(35) | W(34) | W(33) | W(32) | |
| 9 | W(39) | W(38) | W(37) | W(36) | |
| 10 | W(43) | W(42) | W(41) | W(40) | |
| 11 | W(47) | W(46) | W(45) | W(44) | |
| 12 | W(51) | W(50) | W(49) | W(48) | |
| 13 | W(55) | W(54) | W(53) | W(52) | |
| 14 | W(59) | W(58) | W(57) | W(56) | |
| 15 | W(63) | W(62) | W(61) | W(60) | |

FIG. 24

|  | Pattern A | Pattern B | Pattern C |
|---|---|---|---|
| Operation | P[0]=A'[0] | P[0]=A'[0] | P[0]=A'[0] |
|  | P[1]=B'[0] | P[1]=A'[1] | P[1]=A'[1] |
|  | P[2]=A'[1] | P[2]=B'[0] | P[2]=A'[2] |
|  | P[3]=B'[1] | P[3]=B'[1] | P[3]=A'[3] |
|  | Q[0]=A'[2] | Q[0]=A'[2] | Q[0]=B'[0] |
|  | Q[1]=B'[2] | Q[1]=A'[3] | Q[1]=B'[1] |
|  | Q[2]=A'[3] | Q[2]=B'[2] | Q[2]=B'[2] |
|  | Q[3]=B'[3] | Q[3]=B'[3] | Q[3]=B'[3] |
| Stage | #0 | #1 | #2–#6 |

F I G. 26
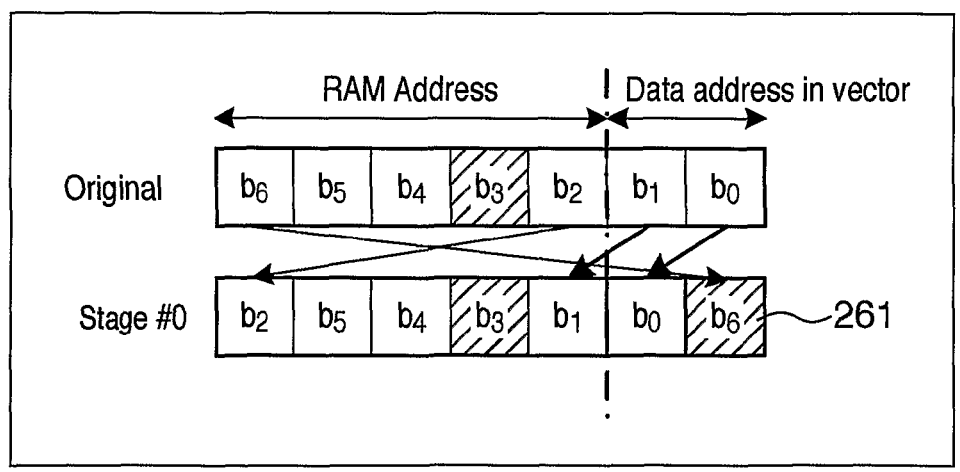

F I G. 28
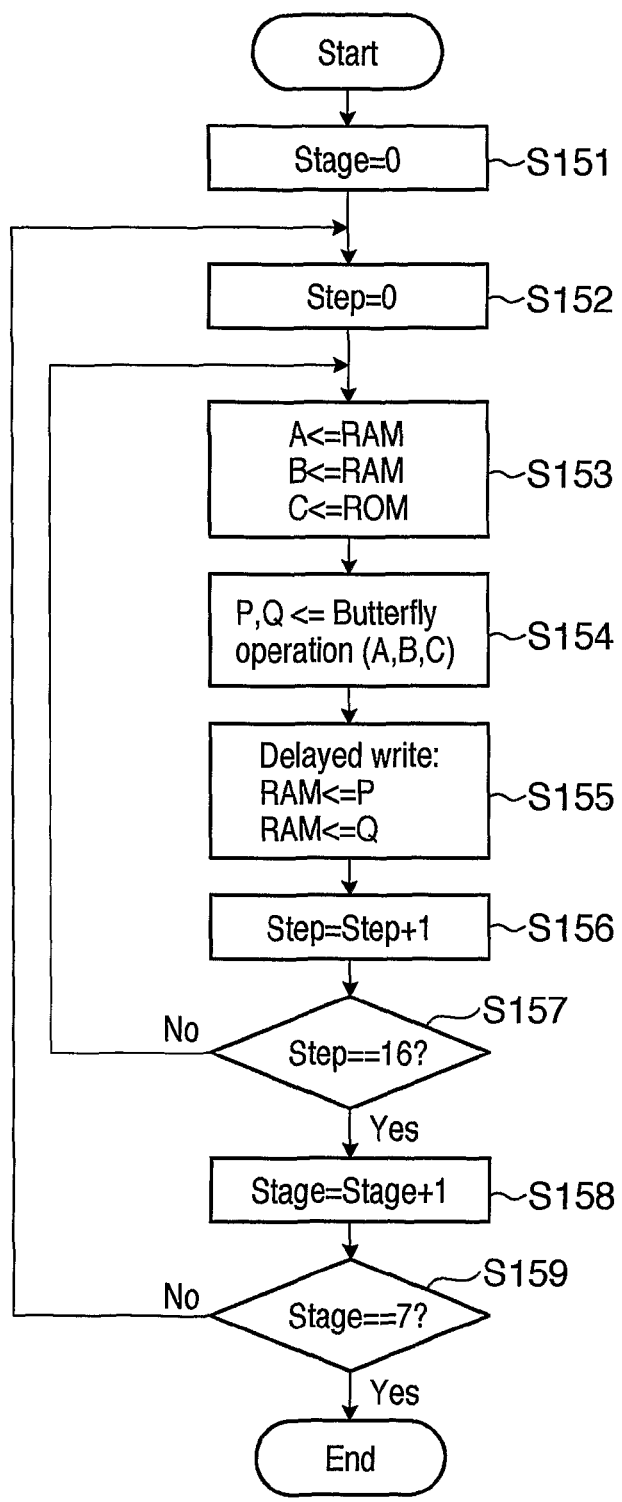

F I G. 32
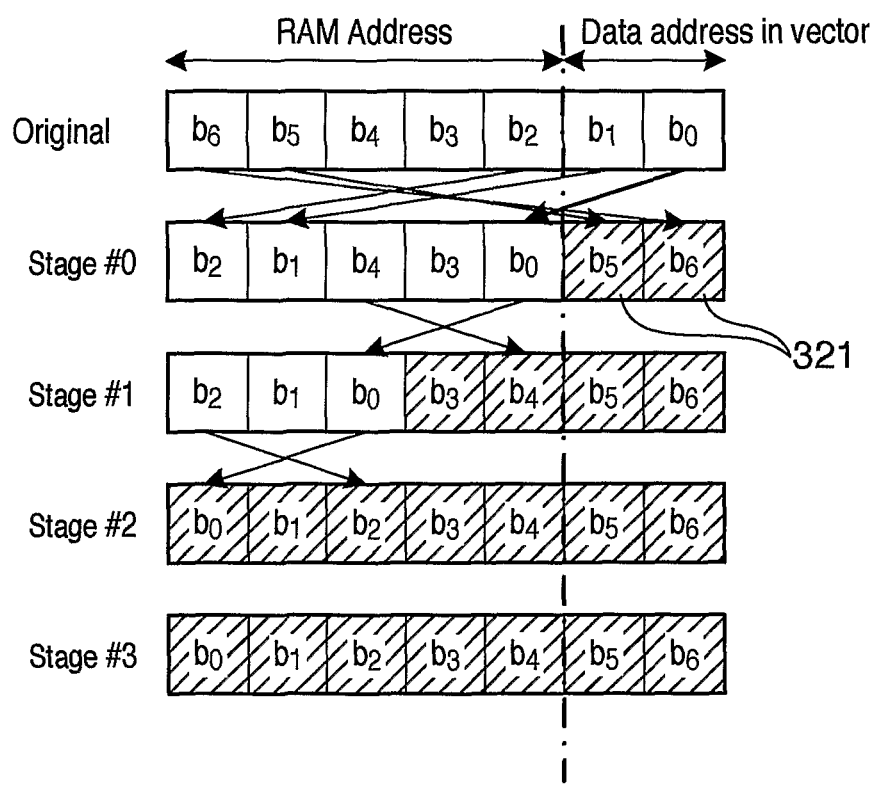

F I G. 33
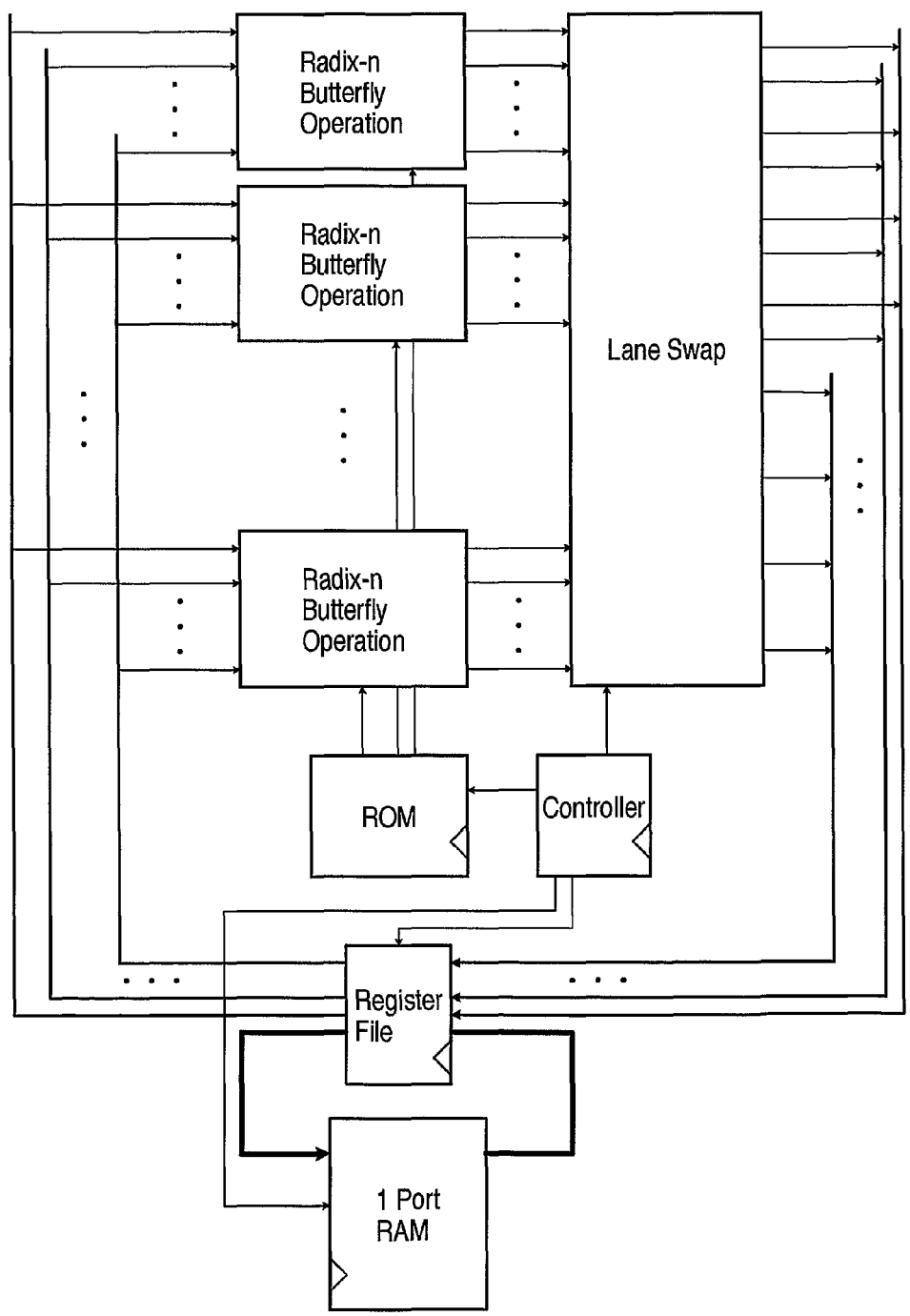

F I G. 34
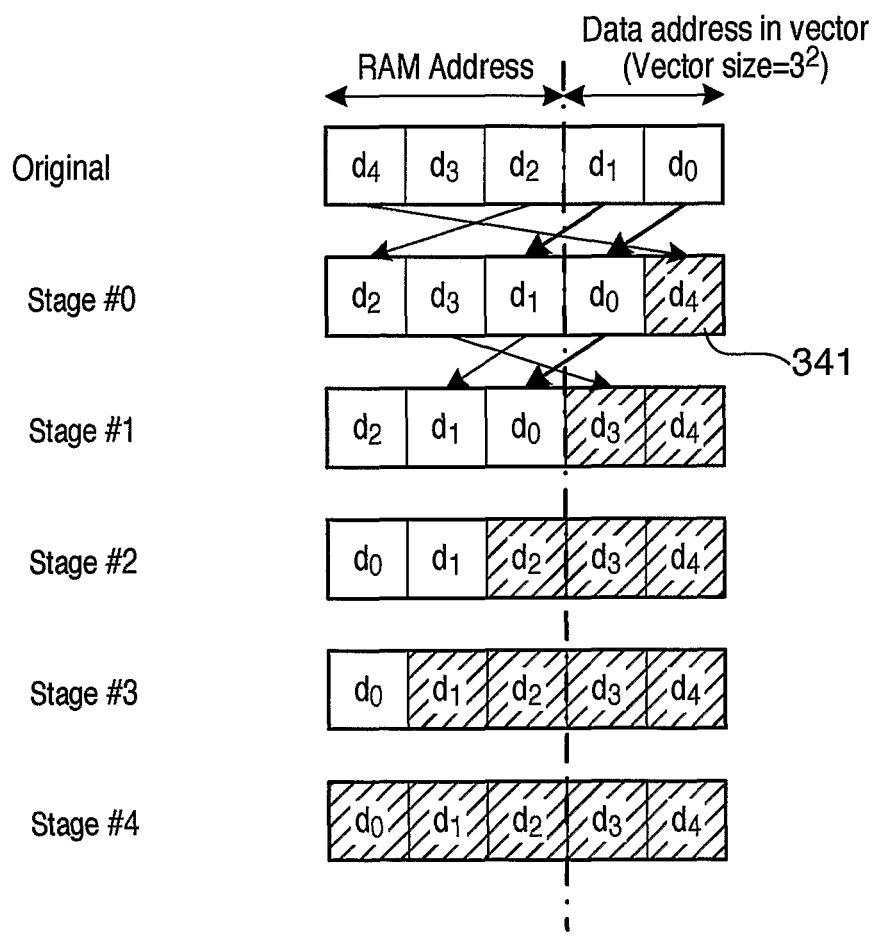

F I G. 38
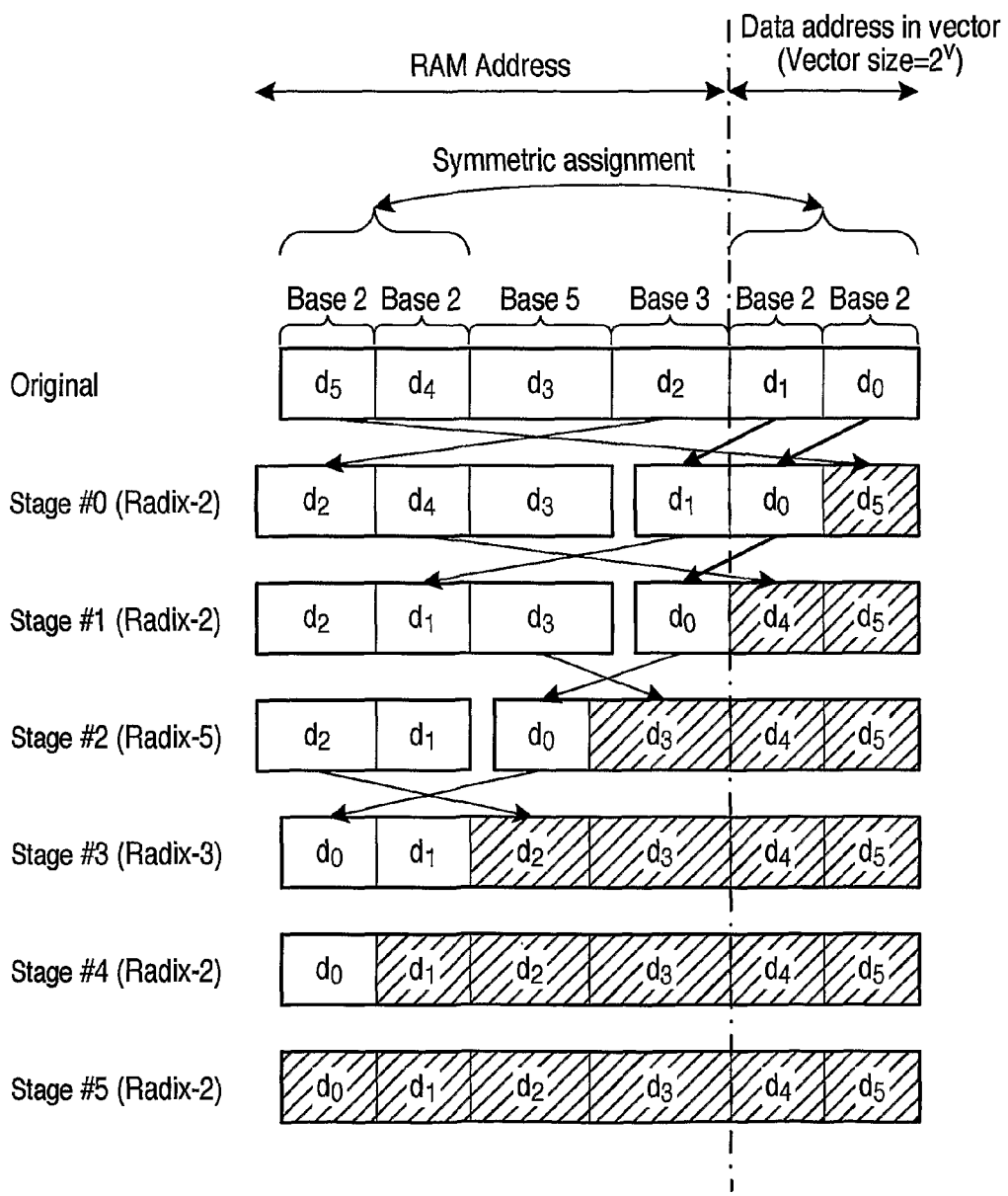

FAST FOURIER TRANSFORM USING A SMALL CAPACITY MEMORY

TECHNICAL FIELD

The present invention relates to an information processing apparatus and a control method thereof, a program, and a computer-readable storage medium, and in particular to, but not limited to, providing Fast Fourier Transformation using a small capacity memory.

BACKGROUND

A Fast Fourier Transformation (FFT) is an efficient algorithm to compute the Discrete Fourier Transform (DFT) and its inverse. Let $x(0), \ldots, x(N-1)$ be N complex numbers. The DFT is defined by the formula $$X(k) = \sum_{i=0}^{N-1} x(i) e^{-j2\pi ki/N} = \sum_{i=0}^{N-1} x(i) W_N^{ik}$$

$$k=0, \ldots, N-1$$

where $W_N^k = e^{-jk(2\pi/N)}$. Evaluating this definition directly requires $O(N^2)$ operations: there are N outputs X(k), and each output requires a sum of N terms. An FFT is any method to compute the same results in O(N log N) operations.

(The Cooley-Tukey Algorithm)

The Cooley-Tukey algorithm is the most common FFT algorithm. It re-expresses the DFT of an arbitrary composite size $N=N_1 N_2$ in terms of smaller DFTs of sizes $N_1$ and $N_2$, recursively, in order to reduce the computation time to O(N log N) for highly-composite N (smooth numbers).

A radix-2 decimation-in-time (DIT) FFT is the simplest and most common form of the Cooley-Tukey algorithm. A radix-2 DIT divides a DFT of size N into two interleaved DFTs (hence the name "radix-2") of size N/2 with each recursive stage. A radix-2 DIT first computes the Fourier transforms of the even-indexed numbers x(2m) (x(0), x(2), ..., x(N-2)) and of the odd-indexed numbers x(2m+1) (x(1), x(3), ..., x(N-1)), and then combines those two results to produce the Fourier transform of the whole sequence.

More explicitly, let us denote the DFT of the even-indexed numbers x(2m) by $X_E(k)$, and the DFT of the odd-indexed numbers x(2m+1) by $X^O(k)$, then it follows:

$$X_E(k) = \sum_{m=0}^{N/2-1} x(2m) W_{N/2}^{km} = \sum_{m=0}^{N/2-1} x(2m) W_N^{2km}$$

$$X_O(k) = \sum_{m=0}^{N/2-1} x(2m+1) W_{N/2}^{km} = \sum_{m=0}^{N/2-1} x(2m+1) W_N^{2km}$$

where $W_{N/2} = W_N^2 = e^{-j4\pi/N}$. Thus, the DFT X(k) for the original data sequence x(i) is represented by:

$$X(k) = \sum_{m=0}^{N/2-1} x(2m) W_N^{2km} + \sum_{m=0}^{N/2-1} x(2m+1) W_N^{k(2m+1)} = X_E(k) + W_N^k X_O(k).$$

The radix-2 DIT FFT is achieved by applying the above procedures to each of $X_E(k)$ and $X_O(k)$ recursively.

FIG. 1 illustrates a signal flow diagram of radix-2 DIT-FFT (N=16). As shown in FIG. 1, the DIT-FFT includes a bit-reverse operation and a plurality of butterfly operations.

The bit-reverse operation is an operation of permutating input data sequences $x(0), \ldots, x(N-1)$. During the permutation, input data sequences are divided into the even-indexed data sequences $x(0), x(2), \ldots, x(N-2)$ and the odd-indexed data sequences $x(1), x(3), \ldots, x(N-1)$, and then the odd-indexed data sequences are concatenated to the even-indexed data sequences. That is, after this concatenation, concatenated data sequences $x(0), x(2), \ldots, x(N-2), x(1), x(3), \ldots, x(N-1)$ are generated. Next, similar operations are recursively executed for each of the first half and the second half of the concatenated data sequences. The permutation described here corresponds to reordering the input data sequences so that a data sequence whose index is represented by $(b_{n-1}, b_{n-2}, \ldots, b_2, b_1, b_0)$ in binary representation is permutated to a position of $(b_0, b_1, b_2, \ldots, b_{n-2}, b_{n-1})$. For this reason, this permutation is called "bit-reverse" operation.

FIG. 2 illustrates an example of bit-reverse operation (N=128). For example, in FIG. 1, each pair of input data sequences such as $\{x(1), x(8)\}((1)_{10}=(0,0,0,1)_2, (8)_{10}=(1,0,0,0)_2)$, $\{x(2), x(4)\}((2)_{10}=(0,0,1,0)_2, (4)_{10}=(0,1,0,0)_2)$, $\{x(3), x(12)\}((3)_{10}=(0,0,1,1)_2, (12)_{10}=(1,1,0,0)_2) \ldots$ are permutated with each other in the bit-reverse operation.

FIG. 3 illustrates a butterfly operation for a radix-2 DIT FFT. In the butterfly operation of FIG. 3, output data P and Q are computed using input data A and B with a predetermined coefficient W by the following formula:

$$P = A + WB$$

$$Q = A - WB$$

where the definition of W has been already described above. As shown in FIG. 1, the given FFT includes a number of above butterfly operations. For example, in the Stage #0 operation in FIG. 1, it follows:

$$x^{(1)}(0) = x(0) + W^0 x(8), \quad x^{(1)}(8) = x(0) - W^0 x(8),$$

$$x^{(1)}(4) = x(4) + W^0 x(12), \quad x^{(1)}(12) = x(4) - W^0 x(12),$$

$$x^{(1)}(2) = x(2) + W^0 x(10), \quad x^{(1)}(10) = x(2) - W^0 x(10),$$

$$x^{(1)}(6) = x(6) + W^0 x(14), \quad x^{(1)}(14) = x(6) - W^0 x(14),$$

$$x^{(1)}(1) = x(1) + W^0 x(9), \quad x^{(1)}(9) = x(1) - W^0 x(9),$$

$$x^{(1)}(5) = x(5) + W^0 x(13), \quad x^{(1)}(13) = x(5) - W^0 x(13),$$

$$x^{(1)}(3) = x(3) + W^0 x(11), \quad x^{(1)}(11) = x(3) - W^0 x(11),$$

and $$x^{(1)}(7) = x(7) + W^0 x(15), \quad x^{(1)}(15) = x(7) - W^0 x(15),$$

As is well known to those skilled in the art, the FFT may be implemented in many other forms. For example, one may implement the radix-2 FFT by decimating sample data sequences in frequency instead of decimating them in time. FIG. 4 illustrates a signal flow diagram of radix-2 decimation-in-frequency (DIF) FFT (N=16). As shown in FIG. 4, the DIF FFT also includes a bit-reverse operation and a plurality of butterfly operations, while the butterfly operation of DIF-FFT is illustrated by FIG. 5.

The butterfly operations can easily be parallelized with a parallelization factor linear with respect to the order of resources. But it is difficult to parallelize the bit-reverse operations with the standard implementation.

The bit-reverse operation in FIG. 4 may be relocated as in FIG. 6. In this case, the coefficient for the butterfly operation shall be shuffled to the bit-reverse format as in FIG. 7. This method is frequently used in DSP (Digital Signal Processor) software since the coefficients can easily be fetched from the array without skipping unnecessary elements. The coefficients for Stage #n are represented as the first half coefficients for Stage #n−1.

One may divide the bit-reverse operation into a plurality of bit-swap operations, and execute the bit-swap operations between the butterfly operations. FIG. 8 illustrates the swapping of two index bits every Stage (N=128). FIG. 9 illustrates a signal flow diagram of radix-2 DIF-FFT (N=16), which implements the bit-swap operations. In FIG. 9, before executing the butterfly operation of Stage #0, the input data sequences are permutated so that the MSB (Most Significant Bit) and LSB (Least Significant Bit) of the index bits are swapped. After executing the butterfly operation of Stage #0, the data sequences are further permutated so that the second MLB and the second MSB of the index bits are swapped, and input into the butterfly operation of Stage #1. For example, in FIG. 9, each pair of input data sequences such as {x(1),x(8)} $((1)_{10}=(0,0,0,1)_2, (8)_{10}=(1,0,0,0)_2)$, {x(3),x(10)} $((3)_{10}=(0,0,1,1)_2, (10)_{10}=(1,0,1,0)_2)$, {x(5),x(12)} $((5)_{10}=(0,1,0,1)_2, (12)_{10}=(1,1,0,0)_2)$ . . . are permutated with each other in the bit-swap operation before the butterfly operation of Stage #0. Similarly, each pair of data sequences such as $\{x^{(1)}(2),x^{(1)}(4)\}$ $((2)_{10}=(0,0,1,0)_2, (4)_{10}=(0,1,0,0)_2)$, $\{x^{(1)}(10),x^{(1)}(12)\}$ $((10)_{10}=(1,0,1,0)_2, (12)_{10}=(1,1,0,0)_2)$, $\{x^{(1)}(3),x^{(1)}(5)\}$ $((3)_{10}=(0,0,1,1)_2, (5)_{10}=(0,1,0,1)_2)$, and $\{x^{(1)}(11),x^{(1)}(13)\}$ $((11)_{10}=(1,0,1,1)_2, (13)_{10}=(1,1,0,1)_2)$ are permutated with each other in the bit-swap operation before the butterfly operation of Stage #1.

The radix-2 butterfly operations are performed N/2 times in one stage. This processing is repeated for $\log_2 N$ stages. Therefore, Cooley-Tukey algorithm requires $$\frac{N \log_2 N}{2} = O(N \log N)$$

butterfly operations in addition to the bit-reverse operation to complete the DFT.

(The Stockham Algorithm)

FIG. 10 illustrates the array interpretation according to the Stockham autosort algorithm (See Charles Van Loan, "Computational Frameworks for the Fast Fourier Transform," 1991, Society for Industrial and Applied Mathematics). In the Stockham algorithm, each data sequence is associated with each element of a two dimensional $2\beta_s \times \alpha_s$ array $x^{(s)}(j,k)$, where $\alpha_s=2^L$, $\beta_s=2^{R-s-2}$, and $N=2\beta_s \alpha_s=2^{R-1}$.

$x^{(s)}(j,k)$ is calculated using the radix-2 butterfly operations as follows.

$$x^{(0)}(j,0)=X(j)$$

$$x^{(s+1)}(j,k)=x^{(s)}(j,k)+W_N^{k\beta_s}x^{(s)}(j+\beta_s,k), \text{ and}$$

$$x^{(s+1)}(j,k+\alpha_s)=x^{(s)}(j,k)-W_N^{k\beta_s}x^{(s)}(j+\beta_s,k),$$

where j=0, 1, . . . , $\beta_s$−1, k=0, 1, . . . , $\alpha_s$−1, then the DFT result is acquired:

$$X(k)=x^{(R-1)}(0,k), N=2^{R-1}.$$

The radix-2 butterfly operations are performed N/2 times in one stage and this processing is repeated for $\log_2 N$ stages. Therefore, the Stockham algorithm requires $$\frac{N \log_2 N}{2} = O(N \log N)$$

butterfly operations to complete the DFT X(0), . . . ,X(N−1). The bit-reverse operations are implicitly performed during the butterfly operations and thus extra calculation time for the bit-reverse operation is not required.

FIG. 11 schematically shows an example of data handling applied for N=16 points (that is, p=4) FFT. As is well-known to those skilled in the art, the Stockham algorithm is also represented as a combination of bit-reverse operations and butterfly operations. FIG. 12 shows how bit-reverse is performed for each Stage. Two rows are fetched from the memory and the butterfly operations are performed for each element. Next, the result is stored to the memory after multiplexing the two streams as one row.

(Radix-n Algorithm)

Cooley-Tukey algorithm can be applied to a radix-n DIT-FFT. For the radix-2 FFT, the Cooley-Tukey algorithm computes the DFTs for even-indexed numbers x(2m) and odd-indexed numbers x(2m+1). Instead, the algorithm computes the DFTs for numbers x(nm), x(nm+1), . . . and x(nm+(n−1)) for the radix-n FFT.

For radix-n DIT-FFT, digit-reverse processing is performed for permutating input data sequences in a base-n number. The digit-reverse is defined as the expansion of the binary (base-2) bit-reverse to the general base number.

In the digit-reverse operation, the input data sequences are permutated so that the MSD (Most Significant Digit) and LSD (Least Significant Digit) of the index digits are swapped in the same way as in bit-reverse.

(Mixed Radix Algorithm)

The radix may be varied for each stage. The digit-reverse for the mixed radix may be performed using the mixed base number. The mixed base number means that the base is different for each digit.

As an example, a 30 point DIF-FFT with mixed radix of 2, 3 and 5 will be explained hereinafter.

A 30 point DFT is defined as follows.

$$X(k) = \sum_{n=0}^{29} x(n) W_{30}^{nk}$$

where $W_N^k = e^{-j2(2\pi/N)}$.

Here we define as:

$$X_{E0}(k) = \sum_{m=0}^{4} x(2 \cdot 3m) W_5^{mk}$$

$$X_{E1}(k) = \sum_{m=0}^{4} x(2(3m+1)) W_5^{mk}$$

$$X_{E2}(k) = \sum_{m=0}^{4} x(2(3m+2)) W_5^{mk}$$

$$X_{O0}(k) = \sum_{m=0}^{4} x(2 \cdot 3m+1) W_5^{mk}$$

$$X_{O1}(k) = \sum_{m=0}^{4} x(2(3m+1)+1) W_5^{mk}$$

-continued $$X_{O2}(k) = \sum_{m=0}^{4} x(2(2m+2)+1)W_5^{mk}$$

Assume $$X_E(k) = \sum_{m=0}^{14} x(2m)W_{15}^{mk} \text{ and } X_O(k) = \sum_{m=0}^{14} x(2m+1)W_{15}^{mk},$$

then it follows:

$$X_E(k) = \sum_{m=0}^{14} x(2m)W_{15}^{mk}$$
$$= \sum_{m=0}^{4} x(2 \cdot 3m)W_{15}^{3mk} + \sum_{m=0}^{4} x(2(3m+1))W_{15}^{(3m+1)k} + \sum_{m=0}^{4} x(2(3m+2))W_{15}^{(3m+2)k}$$
$$= \sum_{m=0}^{4} x(2 \cdot 3m)W_5^{mk} + W_5^k \sum_{m=0}^{4} x(2(3m+1))W_5^{mk} + W_5^{2k} \sum_{m=0}^{4} x(2(3m+2))W_5^{mk}$$
$$= X_{E0}(k) + W_5^k X_{E1}(k) + W_5^{2k} X_{E2}(k)$$

$$X_O(k) = \sum_{m=0}^{14} x(2m+1)W_{15}^{mk}$$
$$= \sum_{m=0}^{4} x(2 \cdot 3m+1)W_{15}^{3mk} + \sum_{m=0}^{4} x(2(3m+1)+1)W_{15}^{(3m+1)k} + \sum_{m=0}^{4} x(2(2m+2)+1)W_{15}^{(3m+2)k}$$
$$= \sum_{m=0}^{4} x(2 \cdot 3m+1)W_5^{mk} + W_5^k \sum_{m=0}^{4} x(2(3m+1)+1)W_5^{mk} + W_5^{2k} \sum_{m=0}^{4} x(2(2m+2)+1)W_5^{mk}$$
$$= B_{O0}(k) + W_5^k B_{O1}(k) + W_5^{2k} B_{O2}(k)$$

Accordingly, it follows:

$$X(k) = \sum_{m=0}^{14} x(2m)W_{30}^{2km} + \sum_{m=0}^{14} x(2m+1)W_{30}^{k(2m+1)} = X_E(k) + W_{30}^k X_O(k)$$

FIG. 13A and 13B illustrate the signal flow diagram of above operations. As shown in FIGS. 13A and 13B, the DIT-FFT includes a digit-reverse operation and a plurality of butterfly operations. In these figures, we denote mixed-base number for the index of the input data as $l_2 m_3 n_5$ and the index after the digit reverse as $n_5 m_3 l_2$, where the base is denoted in the subscript for each digit here, that is, l is a base-5 (quinary) number, m is a base-3 (ternary) number, and n is a base-2 (binary) number.

The processing speed required for FFT is increasing year by year for high speed wireless communications utilizing OFDM (Orthogonal Frequency Division Multiplexing) such as LTE (Long Term Evolution), LTE advanced, WiMAX, WirelessHD and so on. However, the improvement of clock frequency on baseband chips has been slower than the required processing speed. Thus, the improvement of FFT speed by parallelization is required.

In the standard FFT algorithm, it is difficult (or costly) to parallelize bit-reverse operations. Normally the bit-reverse operations are performed element-by-element and this causes a bottleneck in the FFT.

In the Stockham autosort algorithm, the input and output buffers cannot be shared since the algorithm shuffles all data. This leads to doubling in the size of memory required for the calculation. For example, when computing a 2048 point FFT with a 32-bit complex value, the standard algorithm requires 8 KB of memory while Stockham autosort algorithm requires 16 KB of memory. The size of memory required is increasing as high-speed communications are deployed.

SUMMARY

Accordingly, the present invention provides technologies for implementing a high-speed Fast Fourier Transform algorithm with a small memory.

According to one aspect of the present invention, an information processing apparatus for performing a radix-2 Fast Fourier Transform (FFT) on a data sequence, includes:

storage means for including a plurality of storage areas, each of which stores a plurality of data elements to be processed and is assigned a storage address;

reading means for reading from the storage means a plurality of sets, each of which includes the plurality of data elements stored in a same storage area;

a plurality of butterfly operation means for performing butterfly operation with predetermined coefficients respectively on a plurality of data elements each of which is included in the plurality of sets read from the storage means, to compute a plurality of result data respectively;

writing means for writing a set including the plurality of result data into the storage means; and control means for controlling each of the means to perform the butterfly operation on all of the data elements stored in the storage medium at every stage of the FFT operation, wherein each stage of the FFT operation includes a plurality of operation steps, and at every operation step the control means controls each of the means so that:

the reading means reads from the storage means a first set of data elements referred by a first storage address A, a second set of data elements referred by a second storage address A+1, a third set of data elements referred by a third storage address A+$2^m$, and a fourth set of data elements referred by a fourth storage address A+$2^m$+1, the plurality of butterfly operation means perform radix-2 butterfly operation on the data elements included in the first set and the data elements included in the third set to compute a first and third set of the result data, and perform radix-2 butterfly operation on the data elements included in the second set and the data elements included in the fourth set to compute a second and fourth set of the result data, and the writing means writes the first set of the result data into the storage area referred by the first storage address A, writes one of the second and third set of the result data into the storage area referred by the second storage address A+1, and the other into the storage area referred by the third storage address A+$2^m$, and writes the fourth set of the result data into the storage area referred by the fourth storage address A+$2^m$+1, where A is zero or a positive integer which is determined for each operation step, and m is a positive integer which is determined for each stage.

According to another aspect of the present invention, an information processing apparatus for performing a radix-2 Fast Fourier Transform (FFT) on a data sequence, includes:

storage means for including a plurality of storage areas, each of which stores a plurality of data elements to be processed and is assigned a storage address;

reading means for reading from the storage means a plurality of sets, each of which includes the plurality of data elements stored in a same storage area;

a plurality of butterfly operation means for performing butterfly operation with predetermined coefficients respectively on a plurality of data elements each of which is included in the plurality of sets read from the storage means, to compute a plurality of result data respectively;

writing means for writing a set including the plurality of result data into the storage means; and control means for controlling each of the means to perform the butterfly operation on all of the data elements stored in the storage medium at every stage of the FFT operation, wherein each stage of the FFT operation includes a plurality of operation steps, and at every operation step the control means controls each of the means so that:

the reading means reads from the storage means a first set of data elements referred by a first storage address A, a second set of data elements referred by a second storage address A+1, a third set of data elements referred by a third storage address A+$2^m$, and a fourth set of data elements referred by a fourth storage address A+$2^m$+1, the plurality of butterfly operation means perform radix-2 butterfly operation on the data elements included in the first set and the data elements included in the third set to compute a first and third set of the result data, and perform radix-2 butterfly operation on the data elements included in the second set and the data elements included in the fourth set to compute a second and fourth set of the result data, and the writing means writes the first set of the result data into the storage area referred by the first storage address A, writes one of the second and third set of the result data into the storage area referred by the second storage address A+1, and the other into the storage area referred by the third storage address A+$2^m$, and writes the fourth set of the result data into the storage area referred by the fourth storage address A+$2^m$+1, where A is zero or a positive integer which is determined for each operation step, and m is a positive integer which is determined for each stage.

According to still another aspect of the present invention, a control method of an information processing apparatus for performing a radix-2 Fast Fourier Transform (FFT) on a data sequence, wherein the information processing apparatus comprises storage means for including a plurality of storage areas, each of which stores a plurality of data elements to be processed and is assigned a storage address, includes the steps of:

at reading means, reading from the storage means a plurality of sets, each of which includes the plurality of data elements stored in a same storage area;

at performing means, performing butterfly operation with predetermined coefficients respectively on a plurality of data elements each of which is included in the plurality of sets read from the storage means, to compute a plurality of result data respectively;

at writing means, writing a set including the plurality of result data into the storage means; and at controlling means, controlling each of each means of the information processing apparatus to perform the butterfly operation on all of the data elements stored in the storage medium at every stage of the FFT operation, wherein each stage of the FFT operation includes a plurality of operation steps, and at every operation step, each of the means is controlled so that:

the reading means reads from the storage means a first set of data elements referred by a first storage address A, a second set of data elements referred by a second storage address A+1, a third set of data elements referred by a third storage address A+$2^m$, and a fourth set of data elements referred by a fourth storage address A+$2^m$+1, the butterfly operation means perform radix-2 butterfly operation on the data elements included in the first set and the data elements included in the third set to compute a first and third set of the result data, and perform radix-2 butterfly operation on the data elements included in the second set and the data elements included in the fourth set to compute a second and fourth set of the result data, and the writing means writes the first set of the result data into the storage area referred by the first storage address A, writes one of the second and third set of the result data into the storage area referred by the second storage address A+1, and the other into the storage area referred by the third storage address A+$2^m$, and writes the fourth set of the result data into the storage area referred by the fourth storage address A+$2^m$+1, where A is zero or a positive integer which is determined for each operation step, and m is a positive integer which is determined for each stage.

Further features of the present invention will become apparent from the following description of exemplary embodiments with reference to the attached drawings.

BRIEF DESCRIPTION OF DRAWINGS

FIG. 1 illustrates a signal flow diagram of radix-2 decimation-in-time Fast Fourier Transform.

FIG. 7 illustrates an example of coefficients for butterfly operations.

FIG. 10 illustrates an array interpretation according to the Stockham autosort algorithm.

FIG. 15 shows an algorithm of bit-swap processing according to an embodiment of the present invention.

FIG. 21 illustrates an example of address generation for read/write ports of a memory using counter bits.

FIG. 23 illustrates an example of coefficients for butterfly operations for Stage #0.

FIG. 24 shows an example of lane-swap patterns.

FIG. 26 illustrates an example of swapping operations according to an embodiment of the present invention.

FIG. 28 illustrates a flowchart of a Fast Fourier Transform operation performed in a Fast Fourier Transform apparatus according to an embodiment of the present invention.

FIG. 32 illustrates an example of swapping operations according to an embodiment of the present invention.

FIG. 33 illustrates another exemplified hardware configuration of a Fast Fourier Transformation apparatus.

FIG. 34 illustrates an example of swapping operations according to an embodiment of the present invention.

FIG. 38 illustrates an example of swapping operations according to an embodiment of the present invention.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

<First Embodiment>
(Fast Fourier Transform Apparatus)

Figure 14:
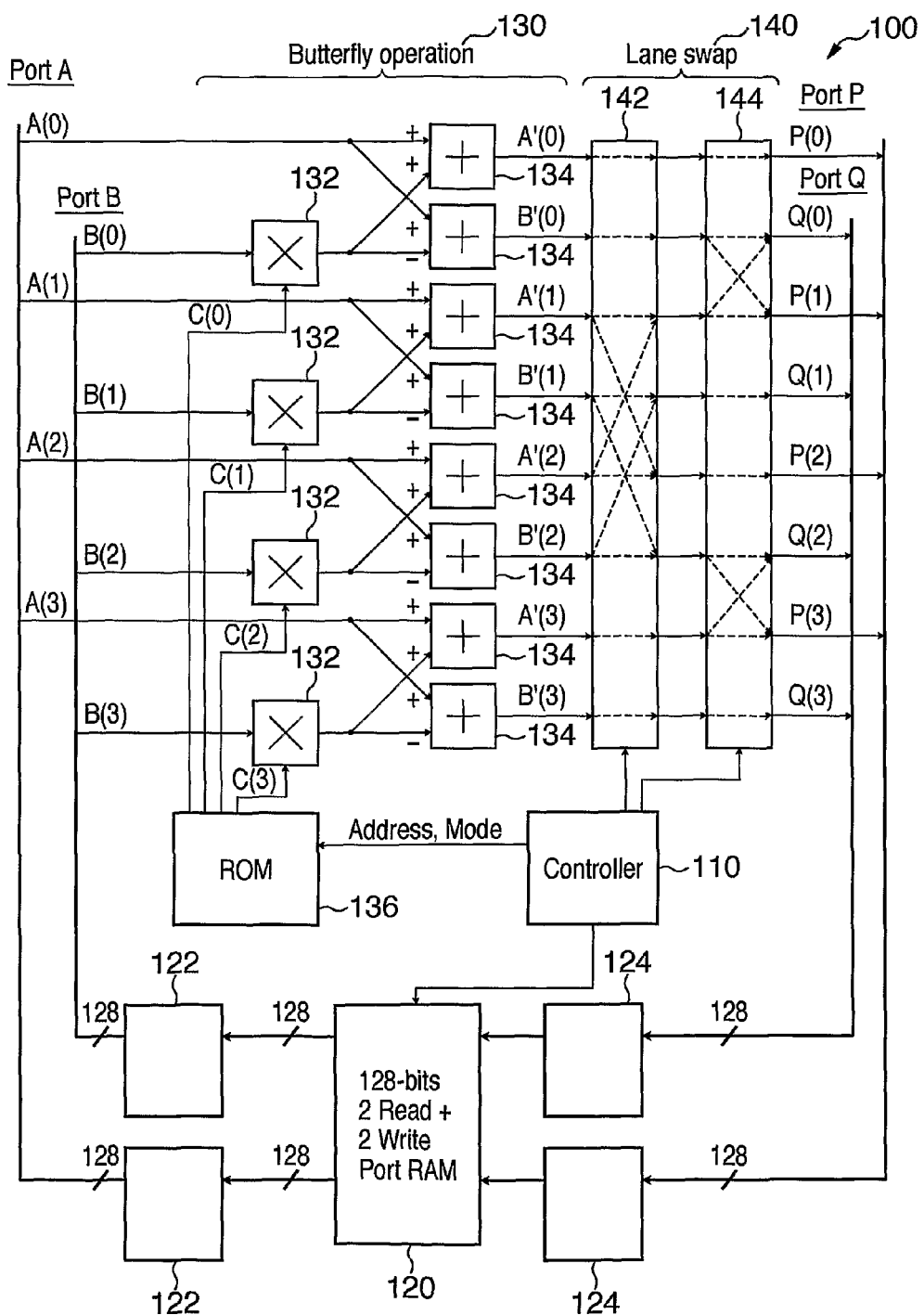
FIG. 14 illustrates an exemplified hardware configuration of a Fast Fourier Transformation apparatus.

FIG. 14 shows an exemplified hardware configuration of a Fast Fourier Transformation (FFT) apparatus (information processing apparatus) 100 according to the first embodiment of the present invention. In this embodiment, the FFT apparatus 100 performs radix-2 decimation-in-time (DIT) FFT. In FIG. 14, the FFT apparatus 100 includes a controller 110, a RAM (Random Access Memory) 120 with two read registers 122 and two write registers 124, a butterfly operation unit 130, and a lane swap unit 140.

The controller 110 controls the overall operations of the FFT apparatus 100. The controller 110 may comprise a CPU (Central Processing Unit). In each stage, the controller 110 determines data addresses for reading data elements (data sequences) to be processed from the RAM 120. As will be described in detail later, the determination of the data address is done by "bit-swap" processing of the data address, which is characteristic to the present invention. The controller 110 then controls the butterfly operation unit 130 to execute a butterfly operation for the data read from the RAM 120. The data elements output from the butterfly operation unit 130 are swapped in the lane swap unit 140, and written into the RAM 120 in accordance with the control by the controller 110.

The RAM 120 is a working memory for holding data elements to be processed and intermediate values in the FFT processing. In this embodiment, the RAM 120 stores 128-bit data for each RAM address (the length of the RAM address is 5 bits, that is, the size of the RAM 120 is 512 bytes). Each 128-bit data item contains four 32-bit complex values x(i), each of which is a data element to be processed. That is, one RAM address points to four data elements to be processed. The set of four data elements is called a "vector" and each data element in the vector is identified by a "vector address". As will be described later, the RAM address and the vector address are concatenated into the "data address", which is to be performed with the bit-swap operation. The RAM 120 comprises two read registers 122 that hold 128-bit read data containing four data elements respectively, and two write registers 124 that hold 128-bit write data, for which the butterfly operations and the lane swap operations have been executed, into the RAM 120 respectively.

The butterfly operation unit 140 comprises complex multiplier units 132, complex accumulator units 134, and a Read-Only Memory (ROM) 136. The ROM 136 stores coefficients $W_N^k = e^{-jk(2\pi/N)}$, for N=64, k=0,1, ... ,63. The lane swap unit 140 comprises two swapping units 142 and 144. The detail of the butterfly operation and the swap operation will be described later.

Figure 2:
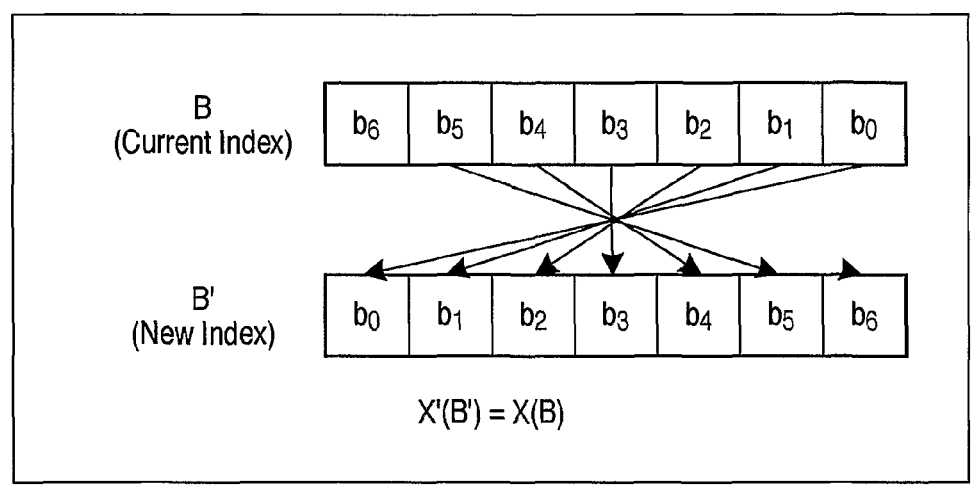
FIG. 2 illustrates an example of a bit-reverse operation.
Figure 3:
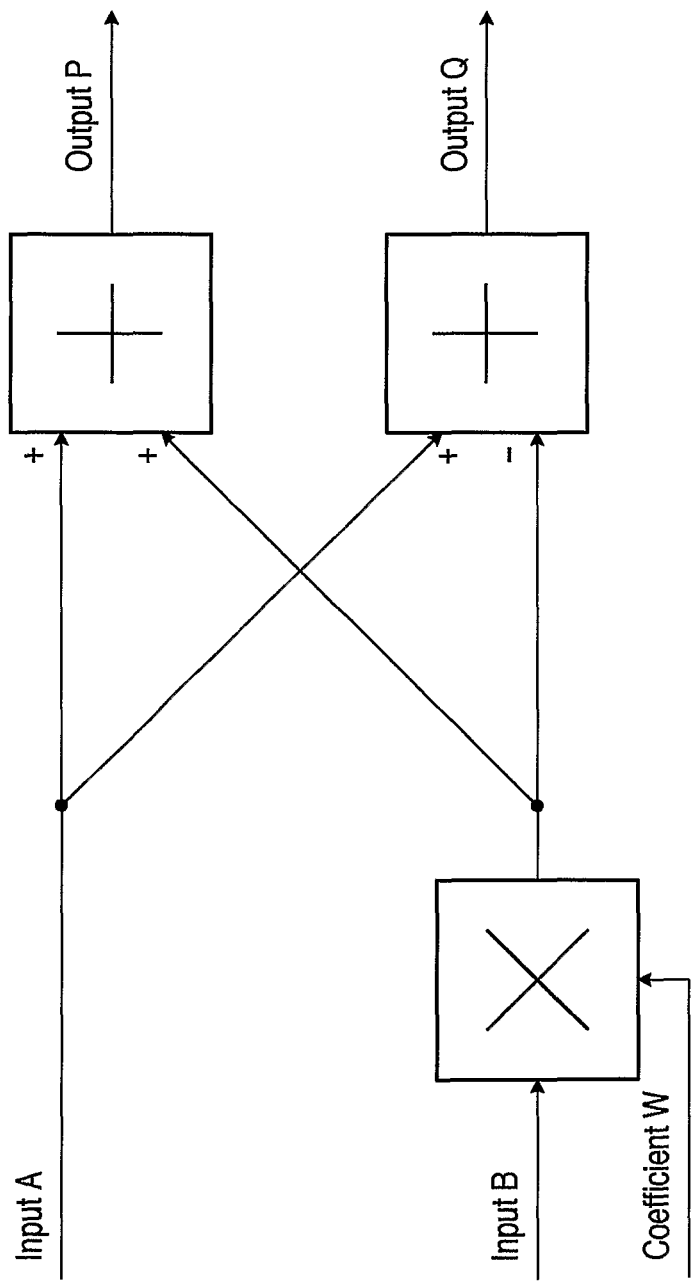
FIG. 3 illustrates a butterfly operation for radix-2 decimation-in-time Fast Fourier Transform.
Figure 4:
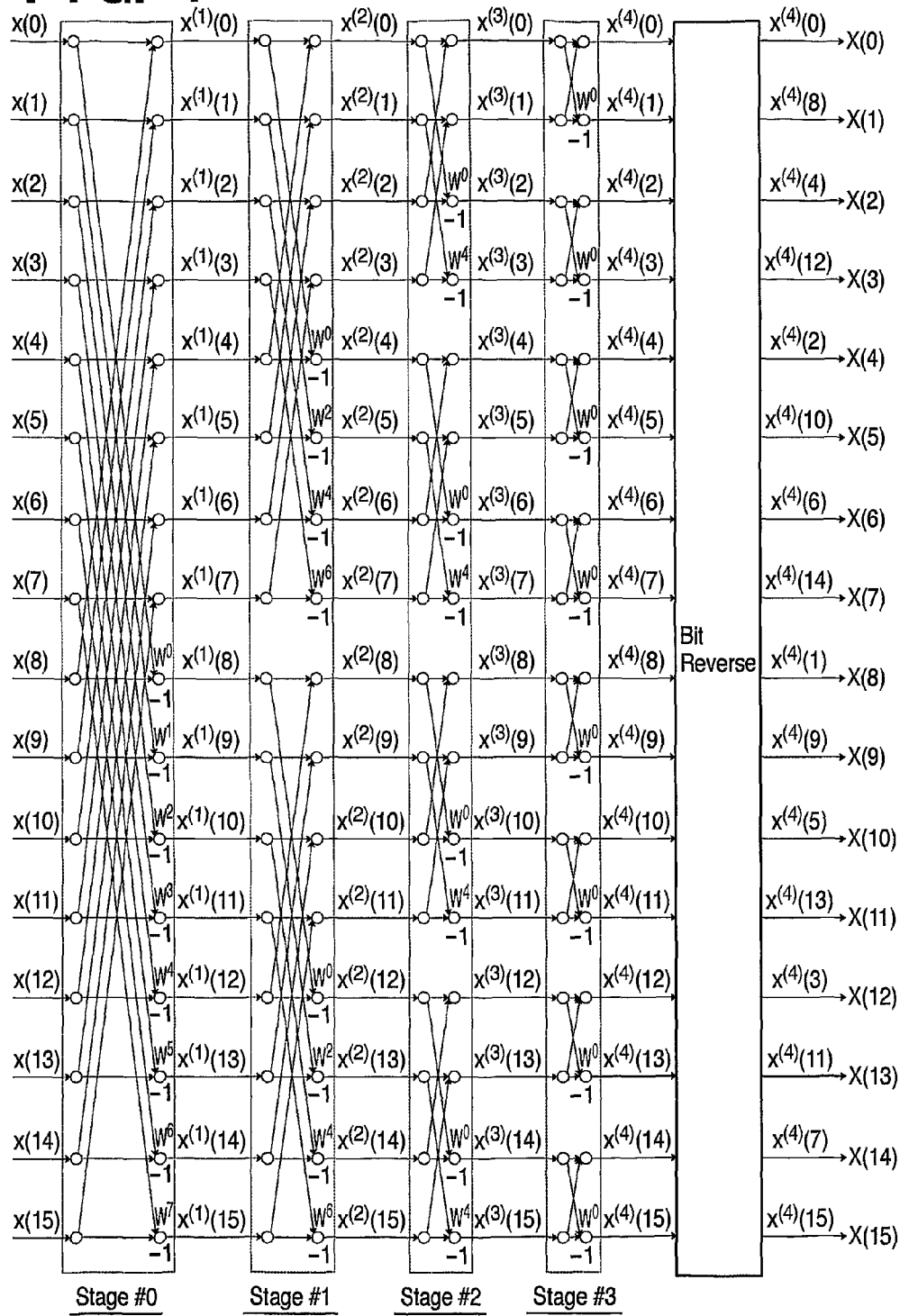
FIG. 4 illustrates a signal flow diagram of radix-2 decimation-in-frequency Fast Fourier Transform.
Figure 5:
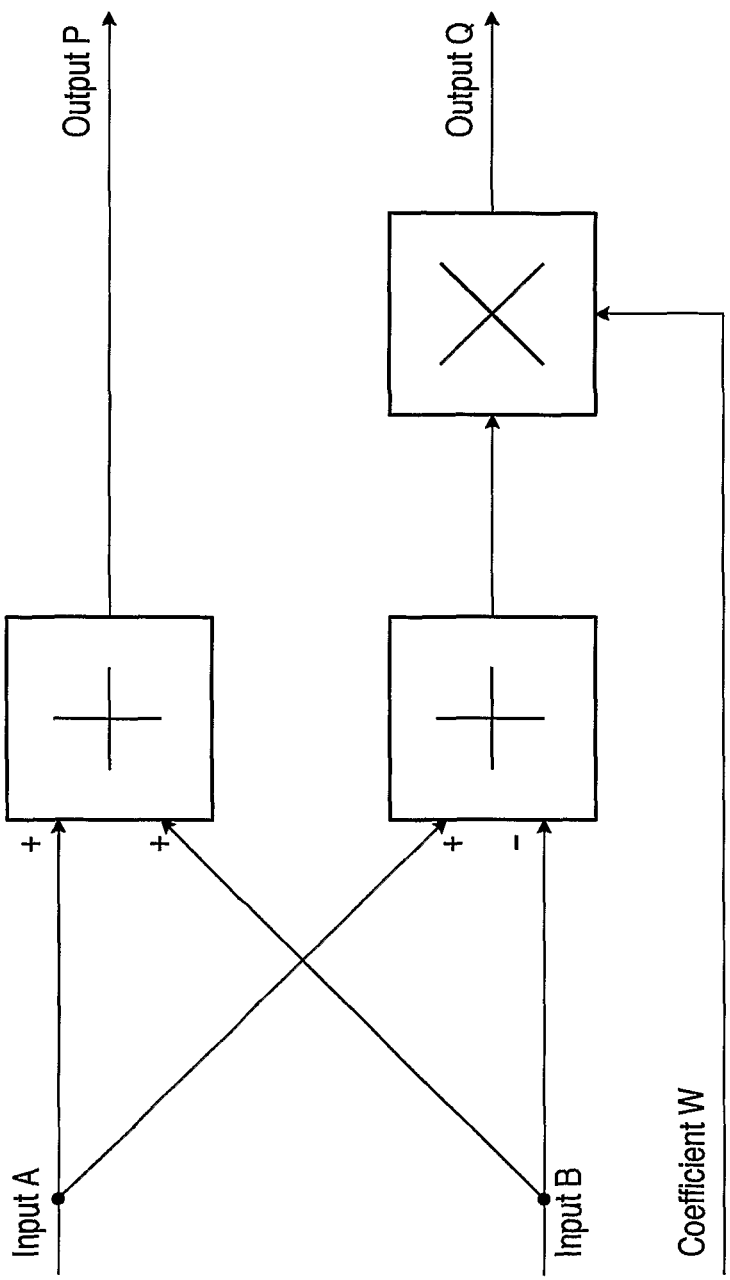
FIG. 5 illustrates a butterfly operation for radix-2 decimation-in-frequency Fast Fourier Transform.
Figure 6:
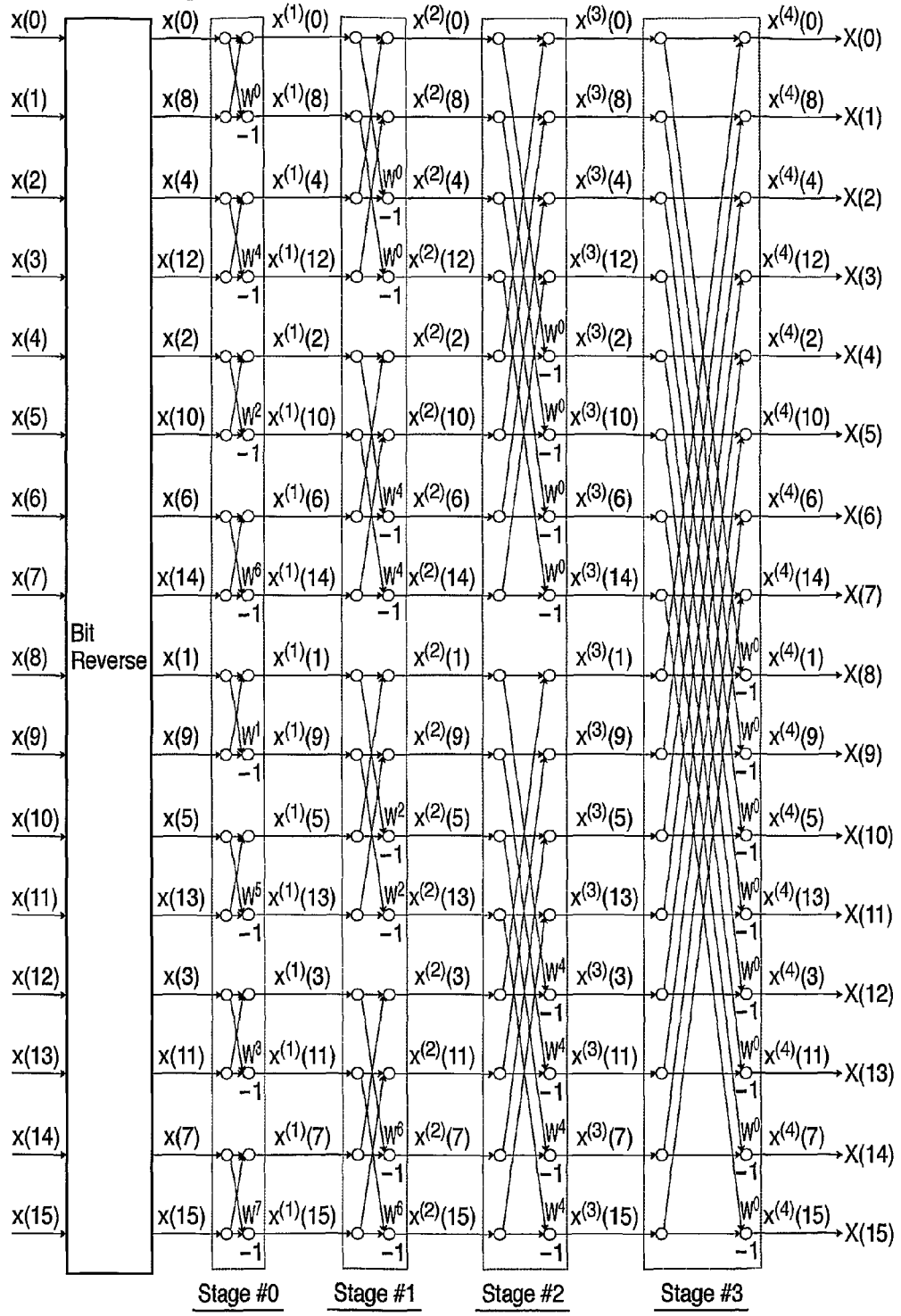
FIG. 6 illustrates another signal flow diagram of radix-2 decimation-in-frequency Fast Fourier Transform.
Figure 8:
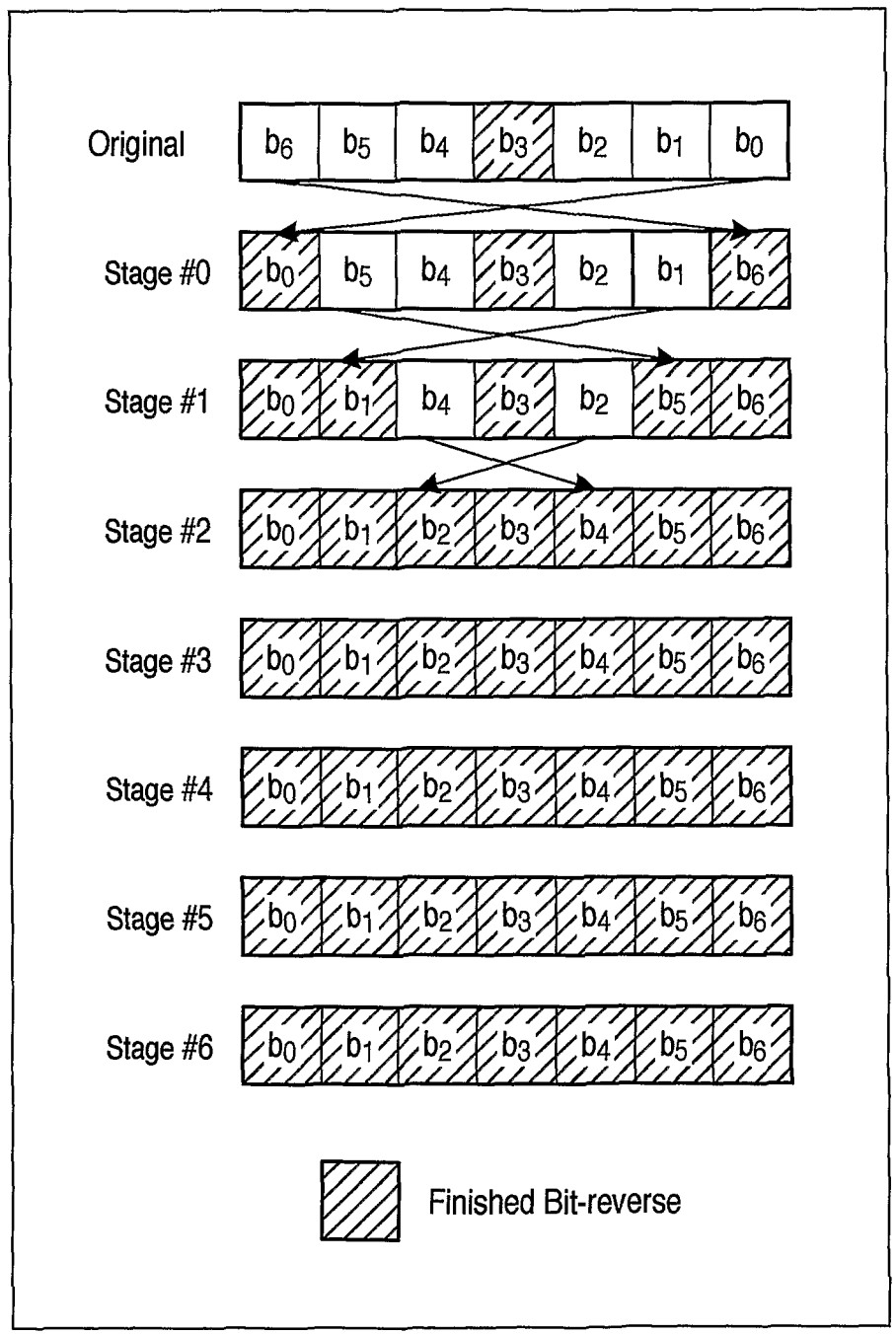
FIG. 8 illustrates an example of swapping operations of two index bits at every stage.
Figure 9:
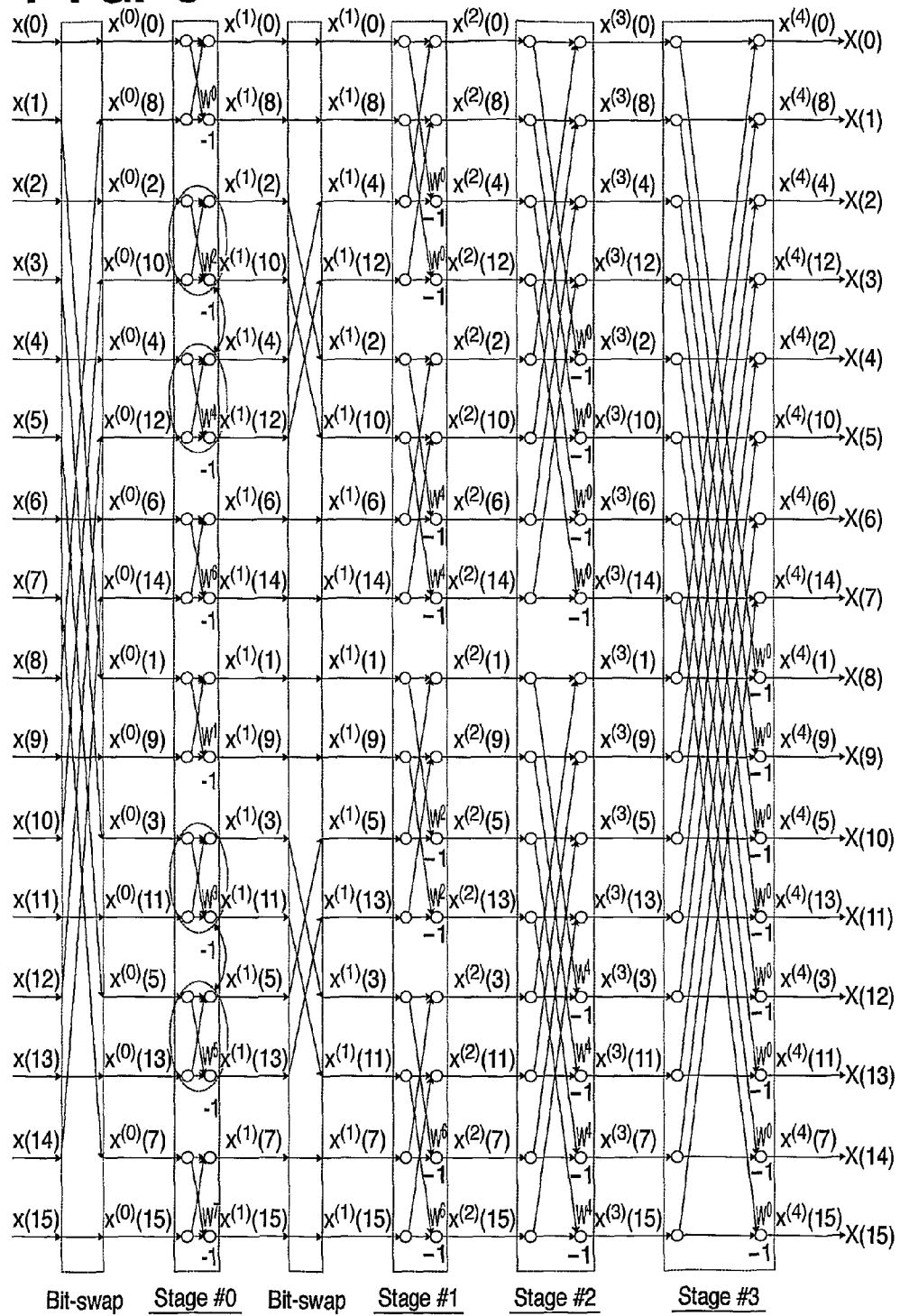
FIG. 9 illustrates a signal flow diagram of radix-2 decimation-in-time Fast Fourier Transform implementing bit-swap operations.
Figure 11:
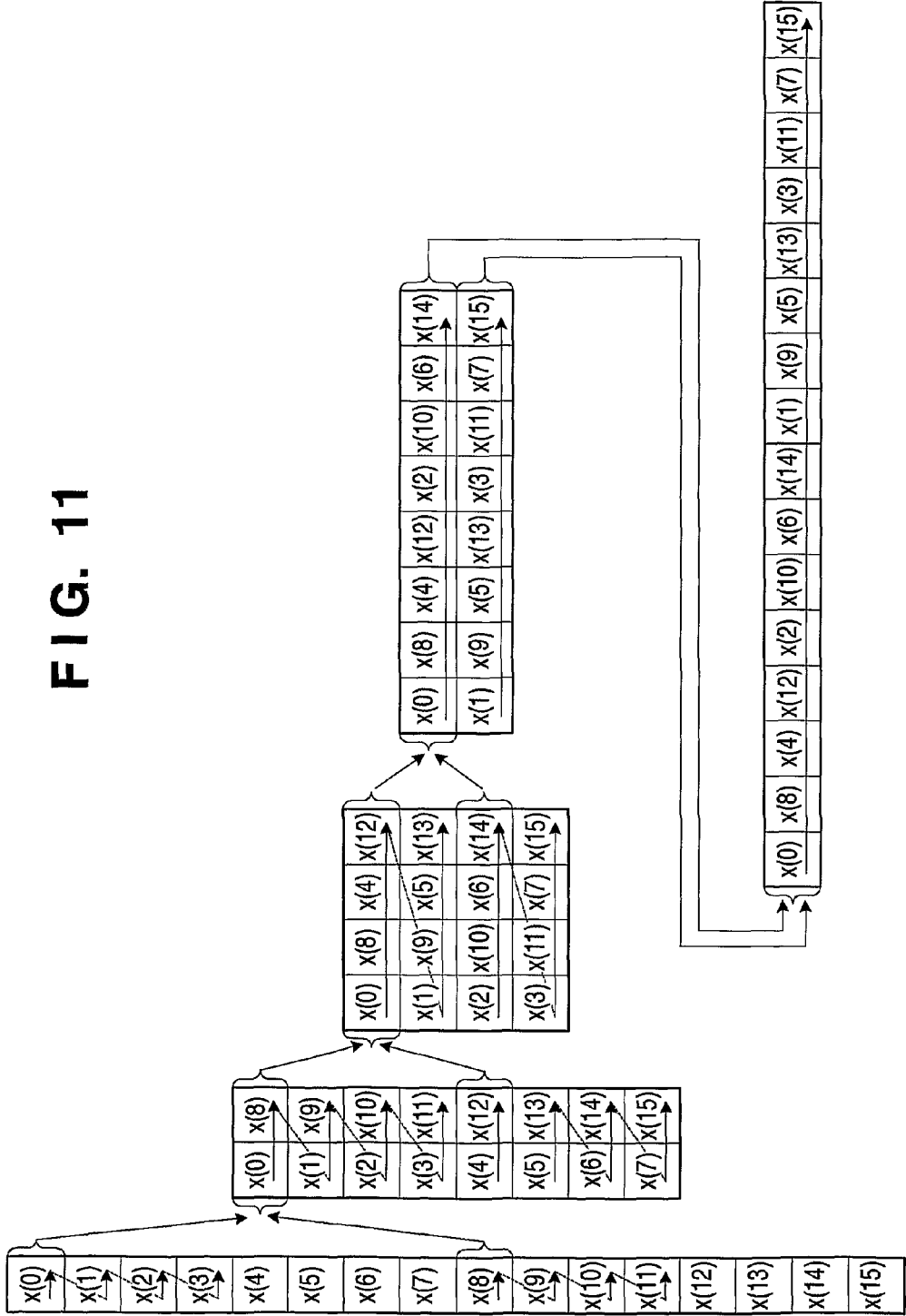
FIG. 11 illustrates an example of data handling according to the Stockham autosort algorithm.
Figure 12:
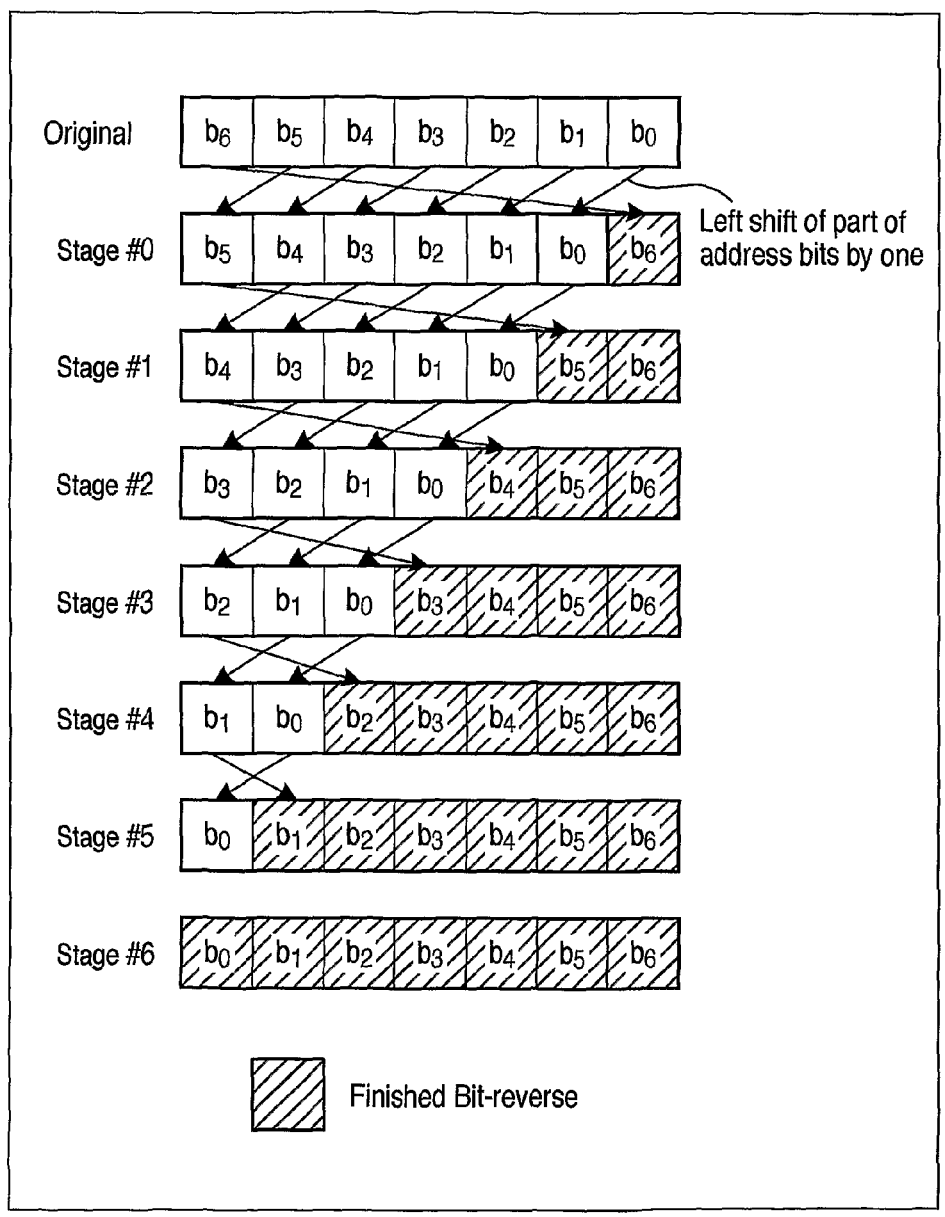
FIG. 12 illustrates an example of bit-reverse operations according to the Stockham autosort algorithm.
Figure 13A:
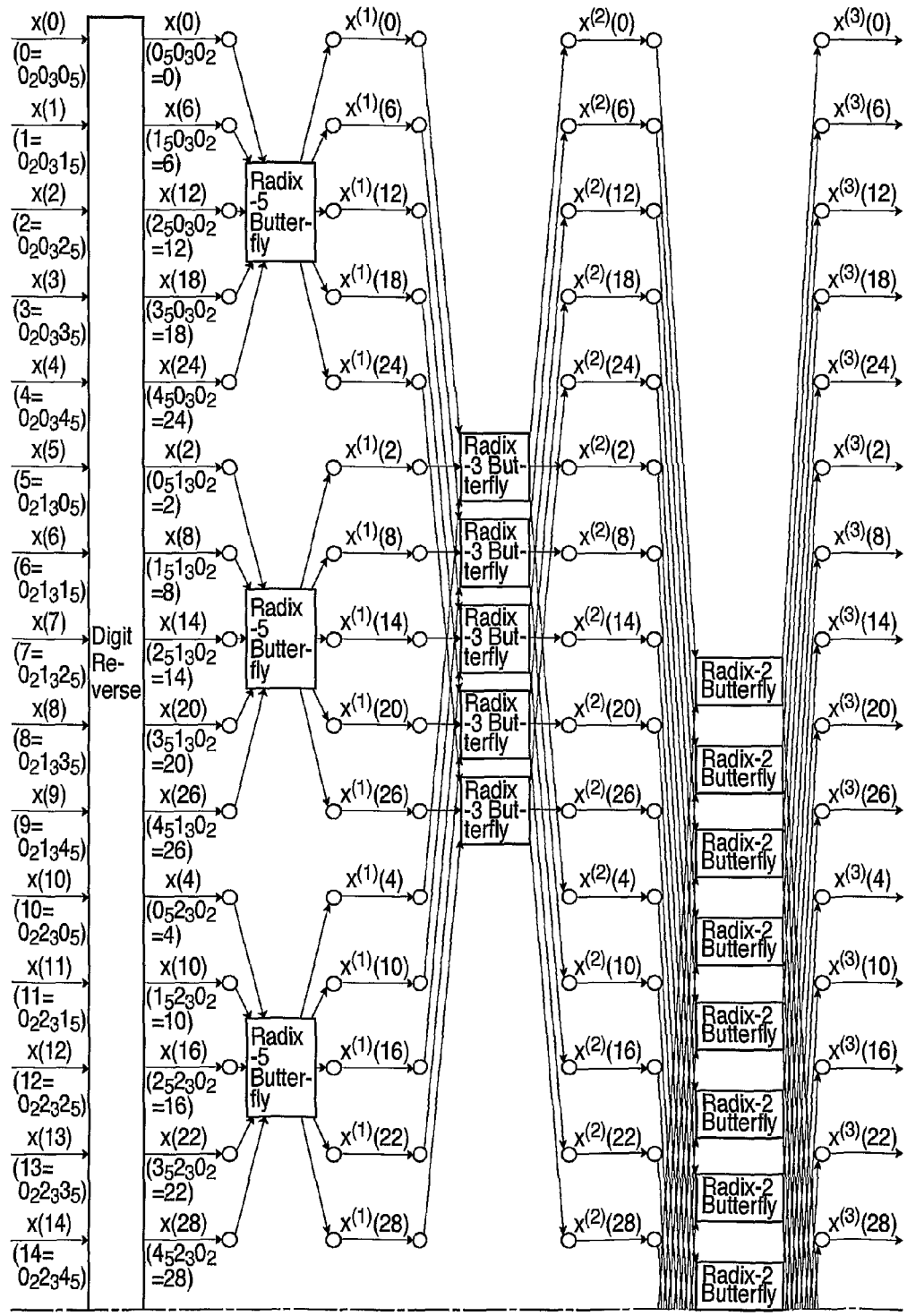
FIG. 13A and FIG. 13B illustrate a signal flow diagram of mixed radix Fast Fourier Transform.
Figure 13B:
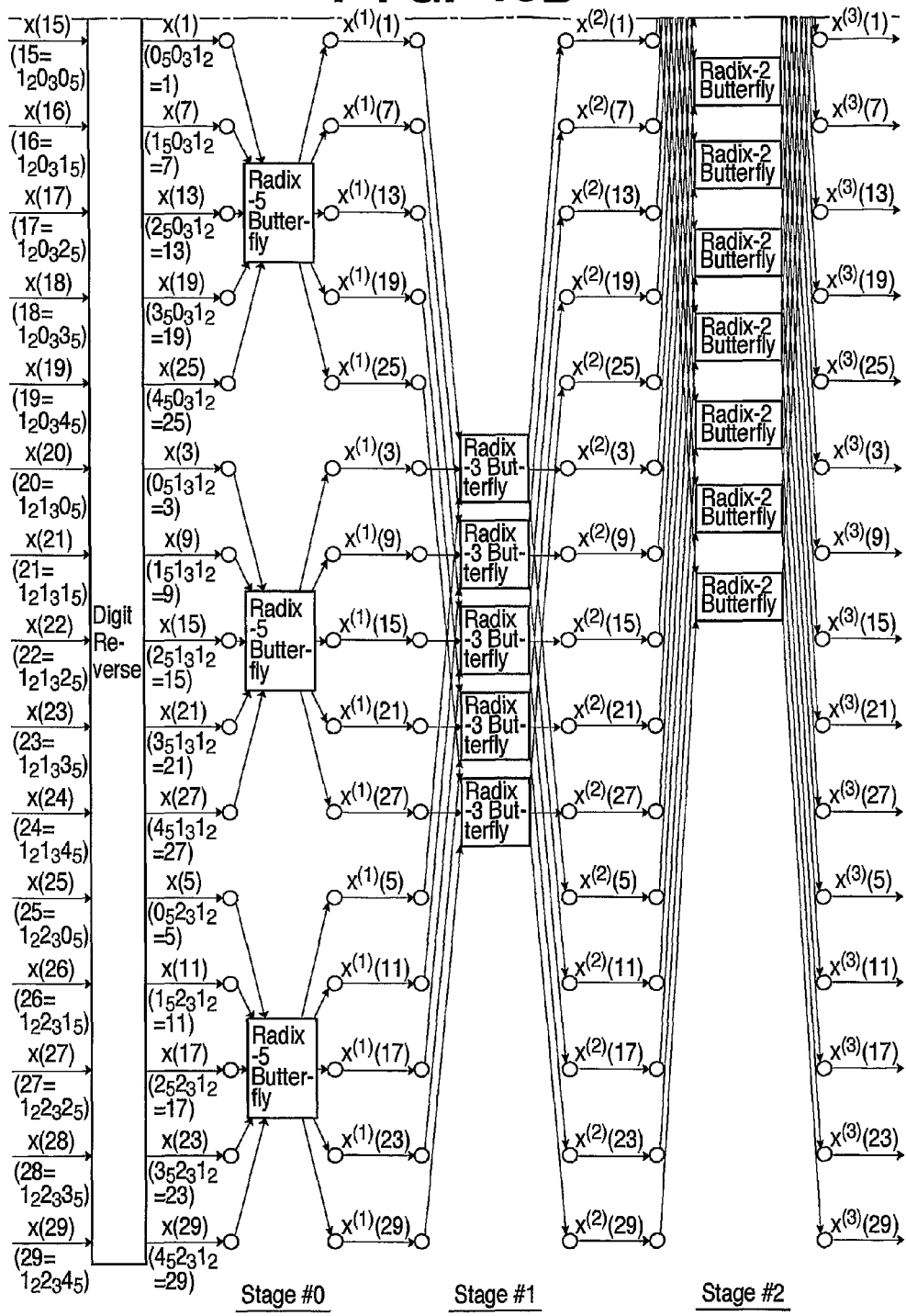
Figure 19:
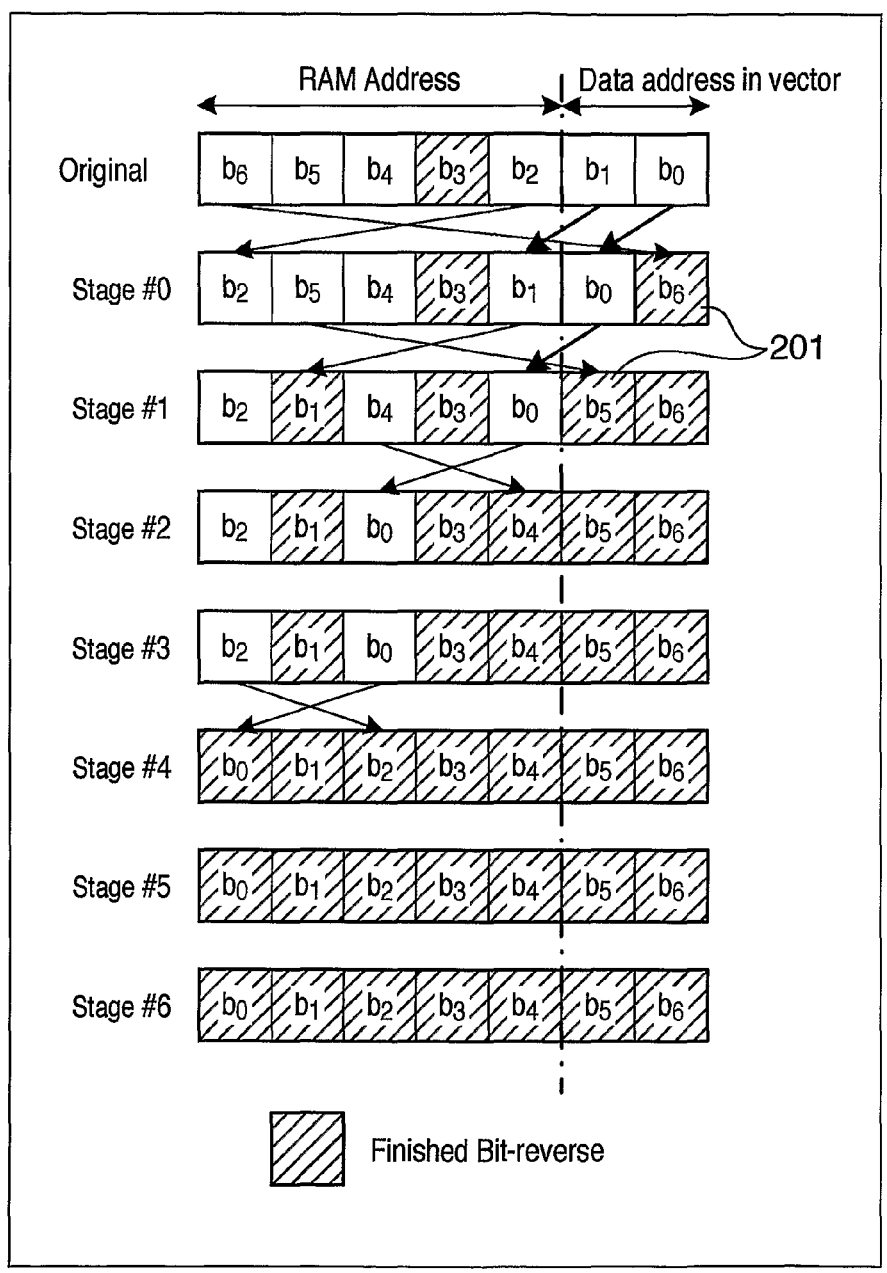
FIG. 19 illustrates an example of swapping operations according to an embodiment of the present invention.

The FFT apparatus 100 according to this embodiment applies different bit-swap operations to intra-vector manipulations for both RAM address bits and vector address bits and inter-vector manipulations for only vector address bits respectively. For the inter-vector manipulations, the FFT apparatus 100 uses a method that is similar to the Stockham autosort algorithm, and left shift of the partial address bits is performed similarly as in FIG. 12. In stage #0, address bits $b_1$ and $b_0$ are left-shifted as in FIG. 19, which corresponds to doubling vector address by alternating and multiplexing every element from two vectors. In stage #1, only address bit $b_0$ is left-shifted as in FIG. 19, which corresponds to alternating and multiplexing every two elements from two vectors.

As the basic operation in this embodiment, at most, the FFT apparatus 100 fetches two vectors, each of which includes four data elements to be processed, from the RAM 120, and then performs the butterfly operation and multiplexing. Then, the FFT apparatus 100 generates two vectors, each of which includes four data elements, and stores them to the RAM 120. The FFT apparatus 100 performs the bit-swap by transposing the addresses of the two vectors to be processed. According to this operation, the FFT apparatus 100 does not require double-buffering as does the Stockham autosort algorithm.

(Bit-Swap Processing)

As described above, the bit-swap operation is performed for the data address, which consists of the RAM address and the vector address (data address in vector).

First, we define notations and assumptions:

We define R to be the total number of the address bits in the data address, v to be the number of bits in the vector address, and R−v to be the number of bits in the RAM address. The number of stages of bit-swap operations is also R when FFT is performed in radix-2.

Concatenation Operator

We define our bit concatenation operator as $$\langle b_{n-1}, b_{n-2}, \cdots, b_1, b_0 \rangle \equiv \sum_{i=0}^{n-1} 2^i b_i.$$

We will refer to the vector data (the set of a plurality of data elements) in the memory as MEM[p], where p is the RAM address.

We will refer to the complex data element in MEM[p] as MEM[p][q], where q is the vector address.

We will also refer to a complex data element in memory as D[u], where u is the data address. That is, $u=2^v p+q$, and D[u]=MEM[p][q].

Butterfly Bit

When the butterfly operations between the memory data and $D\lfloor \langle b_{n-1}, \ldots, b_i, \ldots, b_0 \rangle |_{b_i=0} \rfloor$ and $D\lfloor \langle b_{n-1}, \ldots, b_i, \ldots, b_0 \rangle |_{b_i=0} \rfloor$ are performed for $\langle b_{n-1}, \ldots, b_{i+1}, b_{i-1} \ldots, b_0 \rangle = \langle 0, \ldots, 0 \rangle, \ldots, \langle 1, \ldots, 1 \rangle$, $b_i$ is called a butterfly bit.

Butterfly Operation on Bit #i

When the butterfly operations between the memory data $D\lfloor \langle b_{n-1}, \ldots, b_i, \ldots, b_0 \rangle |_{b_i=0} \rfloor$ and $D\lfloor \langle b_{n-1}, \ldots, b_i, \ldots, b_0 \rangle |_{b_i=1} \rfloor$ are performed for $\langle b_{n-1}, \ldots, b_{i+1}, b_{i-1} \ldots, b_0 \rangle = \langle 0, \ldots, 0 \rangle, \ldots, \langle 1, \ldots, 1 \rangle$, we say that the butterfly operation on bit #i is performed.

We assume that the original place of bit i is $b_i$, and that $d_i$ shall be placed in bit i after the bit-swap processing. Thus, it follows that $d_i = b_{R-1-i}$.

We will refer to the counter value in the FFT apparatus 100 as $\langle c_m, \ldots, c_2, c_1, c_0 \rangle$, which is incremented every stage cycle.

Figure 16:
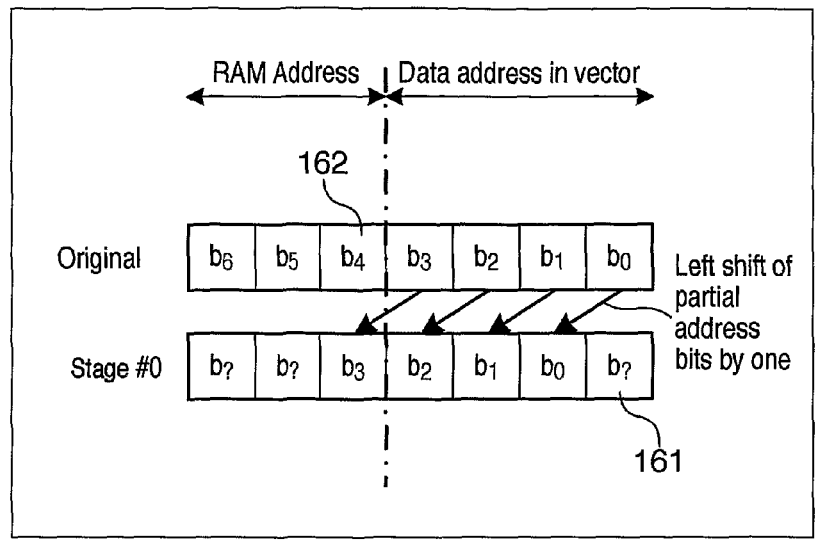
FIG. 16 illustrates an example of swapping operations according to an embodiment of the present invention.
Figure 17:
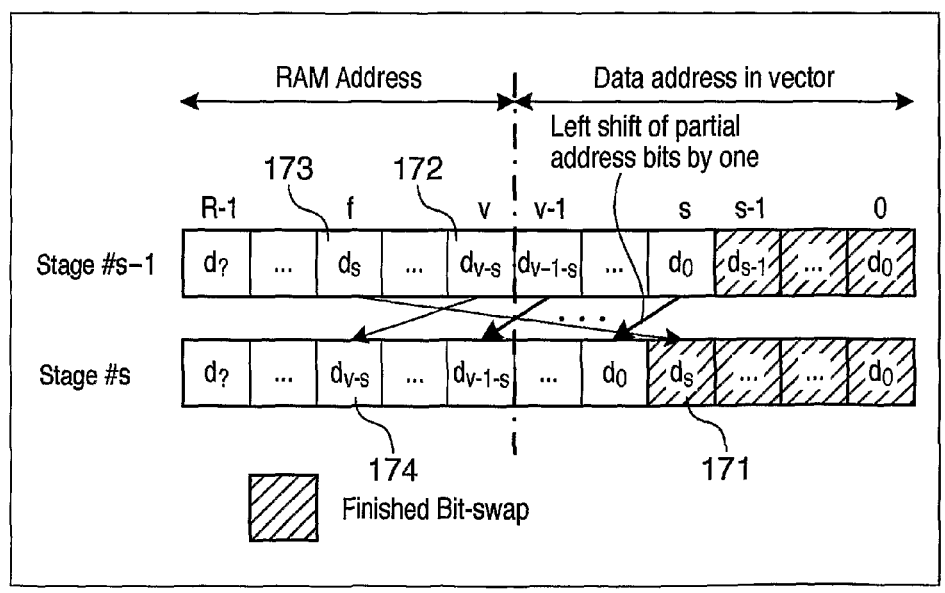
FIG. 17 illustrates an example of swapping operations according to an embodiment of the present invention.
Figure 18:
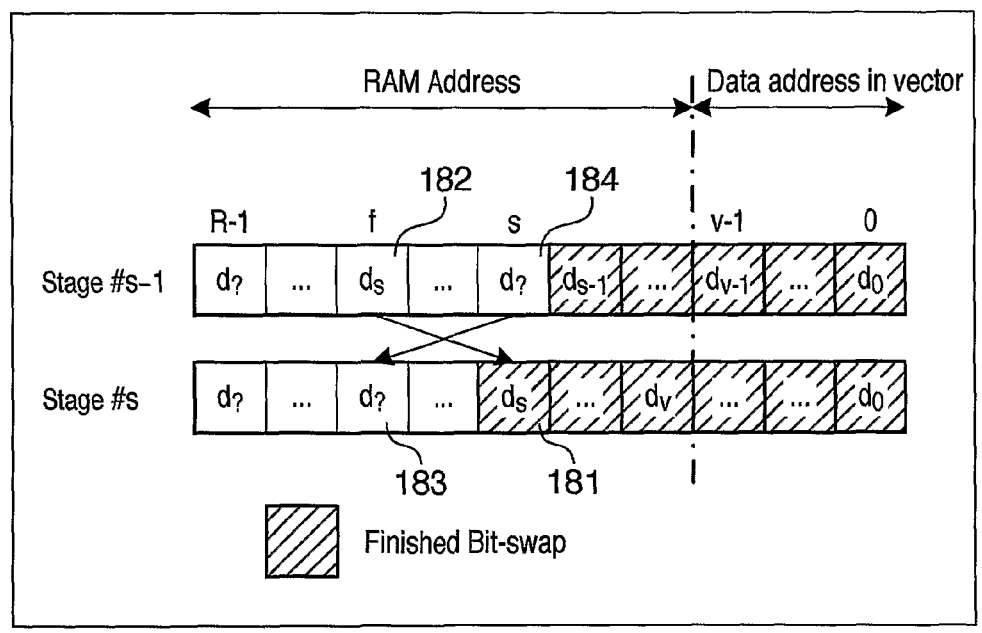
FIG. 18 illustrates an example of swapping operations according to an embodiment of the present invention.

FIG. 15 shows an algorithm of the bit-swap processing according to this embodiment, and FIG. 16-18 schematically illustrate the bit-swap processing according to this embodiment. In this embodiment, the FFT apparatus 100 utilizes different methods for intra-vector and inter-vector manipulations. For intra-vector manipulations, the FFT apparatus 100 uses a method such as the Stockham autosort algorithm and left shift of the partial address bits by one is performed as in FIG. 16. This address shift corresponds to doubling the value of the address, which corresponds to multiplexing two elements.

The shift of the partial address causes:

1) The address bit to be emptied by the shift (denoted by 161 in FIG. 16). In this case, the butterfly bit should be moved to this empty position.
2) The address bit to be pushed away by the shift (denoted by 162 in FIG. 16).

In FIG. 17, the butterfly bit to be moved to a bit position denoted by 171 may be searched from the previous address bits as denoted by 173. The moving of the bit 173 creates an empty bit 174. Thus, it is possible to move the extra bits 172 to 174 to fill the empty bit. Similarly, in FIG. 18, the butterfly bit to be moved to a bit position denoted by 181 may be searched from the previous address bits as denoted by 182. In this case, the moving of the bit 182 creates an empty bit 183. Thus, it is possible to move the bit 184 to fill the empty bit.

For address bits included in the vector address, that is for $d_s$ (0≤s≤v−1), the basic bit-swap processing is as follows. We will refer to the bit position of the butterfly-bit before executing the bit-swap process as f, and the bit position after executing the bit-swap process as s. The FFT apparatus 100 performs following operations 1) to 6) for all $\langle p_{R-v-1}, \ldots, p_{f-v+1}, p_{f-v-1}, \ldots, p_1 \rangle \in \{0, 1, \ldots, 2^{R-v-2}-1\}$. Here, it should be noted that the left side of this formula does not include bits $p_{f-v}, p_0$.

1) The FFT apparatus 100 reads two vectors from the RAM 120, where each vector consists of four complex elements for l=0,1,2,3 as:

$A[l] = \text{MEM}[\langle p_{R-v-1}, \ldots, p_{f-v}, \ldots, p_0 \rangle |_{p_{f-v}=0, p_0=0}][l]$ $B[l] = \text{MEM}[\langle p_{R-v-1}, \ldots, p_{f-v}, \ldots, p_0 \rangle |_{p_{f-v}=1, p_0=0}][l]$ 2) The FFT apparatus 100 executes butterfly operation for all elements (l=0,1,2,3) between A[l] and B[l], and obtains the result as P[l] and Q[l].
3) The FFT apparatus 100 reads two vectors from the RAM 120 and each vector consists of four complex elements as:

$A[l] = \text{MEM}[\langle p_{R-v-1}, \ldots, p_{f-v}, \ldots, p_0 \rangle |_{p_{f-v}=0, p_0=1}][l]$ $B[l] = \text{MEM}[\langle p_{R-v-1}, \ldots, p_{f-v}, \ldots, p_0 \rangle |_{p_{f-v}=1, p_0=1}][l]$,
where l=0,1,2,3.

4) The FFT apparatus 100 writes two result vectors obtained in 2) to the RAM 120, where each vector consists of four complex elements, as follows:

$\text{MEM}[\langle p_{R-v-1}, \ldots, p_{f-v}, \ldots, p_0 \rangle |_{p_{f-v}=0, p_0=0}][l]$ $\text{MEM}[\langle p_{R-v-1}, \ldots, p_{f-v}, \ldots, p_0 \rangle |_{p_{f-v}=0, p_0=1}][l] = Q[l]$,
where l=0,1,2,3.

5) The FFT apparatus 100 executes butterfly operations for all elements (l=0,1,2,3) between A[l] and B[l], and obtains the result as P[l] and Q[l].
6) The FFT apparatus 100 writes the two result vectors obtained in 5) to the RAM 120 and each vector consists of four complex elements as follows:

$\text{MEM}[\langle p_{R-v-1}, \ldots, p_{f-v}, \ldots, p_0 \rangle |_{p_{f-v}=1, p_0=0}][l] = P[l]$ $\text{MEM}[\langle p_{R-v-1}, \ldots, p_{f-v}, \ldots, p_0 \rangle |_{p_{f-v}=1, p_0=1}][l] = Q[l]$,
where l=0,1,2,3.

Steps S153 to S155 in the flowchart FIG. 28 are included in the operations 1) to 6) to clarify the delayed write. That is, the memory write operation for step #2n must be after the memory read operation for step #2n+1, where n=0,1,2,...,7.

For $d_s$ (s≥v), it is not necessary to shift the partial address. If it is necessary to move the butterfly bit (that is, f>s), the basic bit-swap processing is represented as follows. The FFT apparatus 100 performs following operations 1) to 6) for all $\langle p_{R-v-1}, \ldots, p_{f-v+1}, p_{f-v-1}, \ldots, p_{s-v+1}, p_{s-v-1} \ldots, p_0 \rangle \in \{0, 1, \ldots, 2^{R-v-2}-1\}$.

Here, it should be noted that the left side of this formula does not include bits $p_{f-v}$, $p_{s-v}$.

1) The FFT apparatus 100 reads two vectors from the RAM 120, where each vector consists of four complex elements as:

$$A[l]=\text{MEM}[\langle p_{R-v-1},\ldots,p_{f-v},\ldots,p_{s-v},\ldots,p_0\rangle|_{p_{f-v}=0,p_{s-v}=0}][l]$$

$$B[l]=\text{MEM}[\langle p_{R-v-1},\ldots,p_{f-v},\ldots,p_{s-v},\ldots,p_0\rangle|_{p_{f-v}=1,p_{s-v}=0}][l], \text{ where } l=0,1,2,3.$$

2) The FFT apparatus 100 executes the butterfly operation for all elements (l=0,1,2,3) between A[l] and B[l], and obtains the result as P[l] and Q[l].

3) The FFT apparatus 100 reads two vectors from the RAM 120 and each vector consists of four complex elements as:

$$A[l]=\text{MEM}[\langle p_{R-v-1},\ldots,p_{f-v},\ldots,p_{s-v},\ldots,p_0\rangle|_{p_{f-v}=0,p_{s-v}=1}][l]$$

$$B[l]=\text{MEM}[\langle p_{R-v-1},\ldots,p_{f-v},\ldots,p_{s-v},\ldots,p_0\rangle|_{p_{f-v}=1,p_{s-v}=1}][l], \text{ where } l=0,1,2,3.$$

4) The FFT apparatus 100 writes two result vectors obtained in 2) to the RAM 120 and each vector consists of four complex elements as follows:

$$\text{MEM}[\langle p_{R-v-1},\ldots,p_{f-v},\ldots,p_{s-v},\ldots,p_0\rangle|_{p_{f-v}=0,p_{s-v}=0}][l]=P[l]$$

$$\text{MEM}[\langle p_{R-v-1},\ldots,p_{f-v},\ldots,p_{s-v},\ldots,p_0\rangle|_{p_{f-v}=0,p_{s-v}=1}][l]=Q[l], \text{ where } l=0,1,2,3.$$

5) The FFT apparatus 100 executes butterfly operation for all elements (l=0,1,2,3) between A[l] and B[l], and obtains the result as P[l] and Q[l].

6) The FFT apparatus 100 writes two result vectors obtained in 5) to the RAM 120 and each vector consists of four complex elements as follows:

$$\text{MEM}[\langle p_{R-v-1},\ldots,p_{f-v},\ldots,p_{s-v},\ldots,p_0\rangle|_{p_{f-v}=1,p_{s-v}=0}][l]=P[l]$$

$$\text{MEM}[\langle p_{R-v-1},\ldots,p_{f-v},\ldots,p_{s-v},\ldots,p_0\rangle|_{p_{f-v}=1,p_{s-v}=1}][l]=Q[l], \text{ where } l=0,1,2,3.$$

The steps S153 to S155 in the flowchart FIG. 28 are included in the operations 1) to 6) as in the case for $0 \leq s \leq v-1$.

For $d_s$ ($s \geq v$), if it is not necessary to move the butterfly bit (that is, when f=s and the butterfly bit is already at the target position), the basic bit-swap processing is represented as follows. The FFT apparatus 100 performs the following operations 1) to 3) for all $\langle p_{R-v-1},\ldots,p_{s-v+1},p_{s-v-1}\ldots,p_0\rangle \in \{0,1,\ldots,2^{R-v-1}-1\}$. Here, it should be noted that the left side of this formula does not include bits $p_{s-v}$.

1) The FFT apparatus 100 reads two vectors from the RAM 120 as $$A[l]=\text{MEM}[\langle p_{R-v-1},\ldots,p_{s-v},\ldots,p_0\rangle|_{p_{s-v}=0}][l]$$

$$B[l]=\text{MEM}[\langle p_{R-v-1},\ldots,p_{s-v},\ldots,p_0\rangle|_{p_{s-v}=0}][l],$$
where $l=0,1,2,3.$ 2) The FFT apparatus 100 executes the butterfly operation for all elements (l=0,1,2,3) between A[l] and B[l], and obtains the result as P[l] and Q[l].

3) The FFT apparatus 100 writes the result to the RAM 120 as follows:

$$\text{MEM}[\langle p_{R-v-1},\ldots,p_{s-v},\ldots,p_0\rangle|_{p_{s-v}=0}][l]=P[l]$$

$$\text{MEM}[\langle p_{R-v-1},\ldots,p_{s-v},\ldots,p_0\rangle|_{p_{s-v}=1}][l]=Q[l],$$
where $l=0,1,2,3.$ The bit size of the RAM addresses is 5 bits and the bit size of the vector addresses is 2 bits in the FFT apparatus 100 according to this embodiment (FIG. 14). The bit-swap processing in the FFT apparatus 100 is schematically shown as in FIG. 19.

Figure 20:
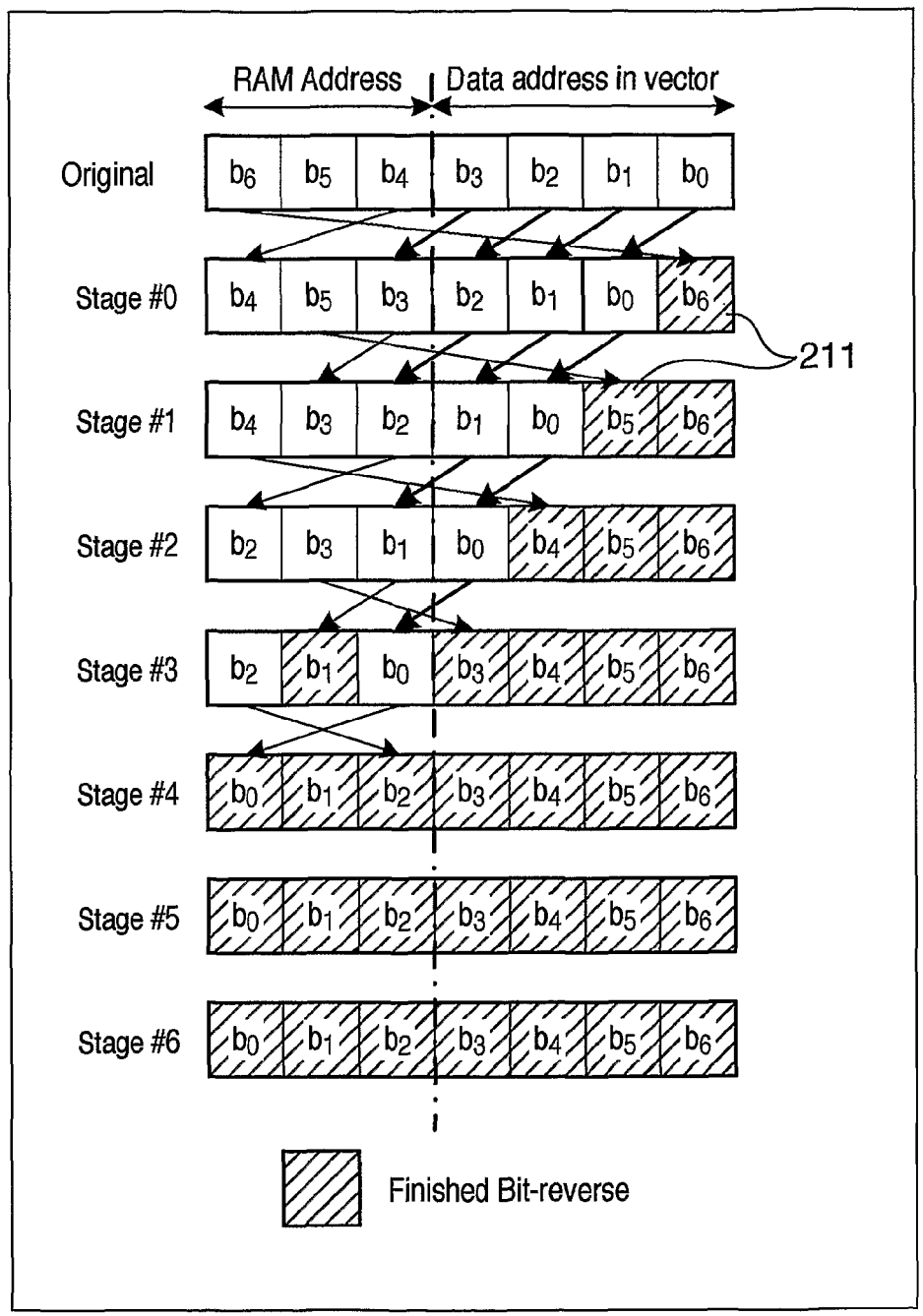
FIG. 20 illustrates an example of swapping operations according to an embodiment of the present invention.

For an FFT apparatus comprising a RAM where the RAM addresses is 3 bits long and the vector addresses is 4 bits long, the bit-swap processing in the FFT apparatus is schematically shown as in FIG. 20.

As mentioned above, only two bits ($p_{f-v}$ and $p_{s-v}$ if $0 \leq s \leq v-1$ else $p_{f-v}$ and $p_0$) in the RAM address are swapped in one stage in accordance with the above method. The remaining bits can be moved to the loop index. That is, the FFT apparatus 100 according to this embodiment performs the calculation for all $\langle p_{R-v-1},\ldots,p_{f-v+1},p_{f-v-1},\ldots,p_1\rangle \in \{0,1,\ldots,2^{R-v-2}-1\}$ if $0 \leq s \leq v-1$ else for all $\langle p_{R-v-1},\ldots,p_{f-v+1},p_{f-v-1},\ldots,p_{s-v+1},p_{s-v-1},\ldots,p_0\rangle \in \{0,1,\ldots,2^{R-v-2}-1\}$. In the loop, the FFT apparatus 100 reads the two vectors from the RAM 120 for four combinations, $\langle p_{f-v},p_0\rangle \in \{0,1,2,3\}$ if else $0 \leq s \leq v-1$ else $\langle p_{f-v},p_{s-v}\rangle \in \{0,1,2,3\}$, performs the butterfly operation and the lane swap operation, and stores the resultant data to the RAM 120 where these two bits in the address were swapped. The FFT apparatus 100 according to this embodiment requires a temporary buffer for storing only four vectors. Such a temporary buffer may be implemented by existing registers that are included in the functional elements of the FFT apparatus 100, such as read registers 122, write registers 124, the lane swap unit 140, or complex accumulator units 134. Therefore, according to this embodiment, the size of the RAM 120 in the FFT apparatus 100 is as large as the one according to the Cooley-Tukey algorithm. On the other hand, in the Stockham autosort algorithm, all RAM address bits are shifted, and FFT operation according to the Stockham autosort algorithm has no bit that can be used as the above loop index. Therefore, the FFT operation according to the Stockham autosort algorithm requires the temporary buffer to store all RAM data, which doubles the amount of RAM required.

(Address Generation for Read/Write Ports of RAM)

The basic four vectors are read via two read registers 122 (A and B), and written to two write registers 124 (P and Q) in the pipeline. Since the transposition is performed within four vectors, it is necessary to maintain the pipeline latency at the butterfly process so as not to destroy the data to be processed before reading.

The FFT operation consists of 7 stages, and one stage is executed in 16 steps. Each step is identified by a 4-bit counter value $\langle c_3,c_2,c_1,c_0\rangle$. FIG. 21 shows the address generation for ports A, B, C and D using the counter bits. In FIG. 21, reference numerals 211 and 212 represent the RAM addresses of the vectors to be read from the RAM 120 via the read registers A and B 122; reference numerals 213 and 214 represent the RAM addresses of the vectors to be written to the RAM 120 via the write registers P and Q 124; reference numeral 215 represents a ROM address of coefficient data, which is stored in the ROM 136 and is to be used for the butterfly operation. A ROM mode 216 identifies a ROM mode that is used for selecting the coefficients of butterfly operations. The detail of reading the coefficients of butterfly operations will be described later with reference to FIG. 23. A lane swap pattern 217 identifies the pattern of lane swap 140. The lane swap operation will be described in detail with reference to FIGS. 24 and 25.

For example, in Stage #1, for each counter value $\langle c_3,c_2,c_1,c_0\rangle = \langle 0,0,0,0\rangle, \langle 0,0,0,1\rangle, \ldots, \langle 1,1,1,1\rangle$, two vectors, whose RAM addresses are $\langle c_3,0,c_2,c_1,c_0\rangle$ and $\langle c_3,1,c_2,c_1,c_0\rangle$, are read from the RAM 120 via two read registers A, B 122. Then, a butterfly operation is executed for the two vectors using coefficients, which are read from the ROM 136 with ROM address ⟨$c_3$,0,0,0⟩ and ROM mode 3. Next, a lane swap is performed at a lane swap 140 in accordance with a lane swap pattern B, and the resultant two vectors are written to the RAM addresses ⟨$c_3,c_0,c_2,c_1$,0⟩ and ⟨$c_3,c_0,c_2,c_1$,1⟩ of the RAM 120 via the write registers P and Q 124.

(Bit-Swapped Address Generator)

Figure 22:
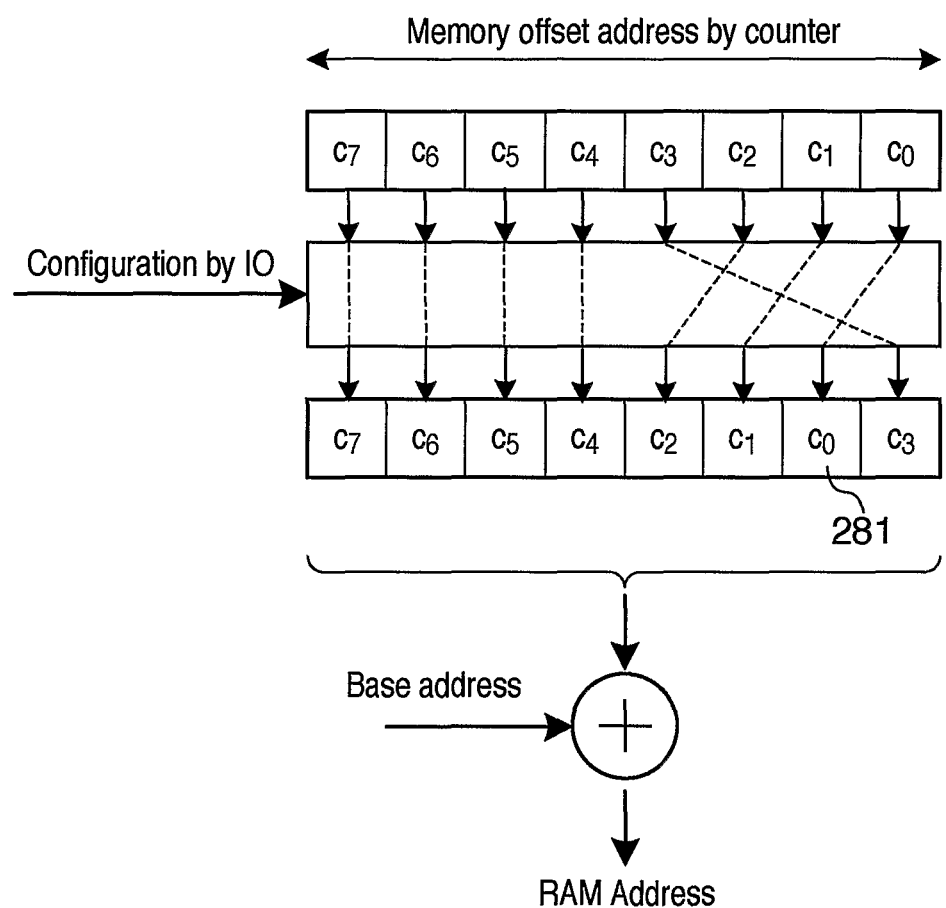
FIG. 22 illustrates an example of a bit-swap address generator.

FIG. 22 illustrates an example of a bit-swap address generator. The address generations are performed by permutating the counter bits c7, c6, . . . , c2, c1 and c0 as in FIG. 22. As shown in FIG. 22, configuration data is provided into the address generator to indicate the original bit positions of each of the output bits. For example, the configuration data (7,6,5,4,2,1,0,3) is provided by IO, which indicates the original bit positions of each of the output bits, and then the counter bits c3, c2, c1 and c0 are swapped in accordance with this configuration data. After that, the RAM address (storage address) for the first vector is added as the base address. The resultant data represents a RAM address for reading or writing data.

(Butterfly Operation)

Four radix-2 butterfly operations are performed in parallel using coefficients C(0), C(1), C(2) and C(3), each of which is input into a complex multiplier unit 132 in FIG. 14. FIG. 23 illustrates an example of coefficients for butterfly operations for Stage #0. In FIG. 23, 2301 represents a ROM address. Reference numeral 2302 represents coefficients for each of modes 1, 2, and 3. Note that W(k)=$e^{-j(2\pi k/64)}$=cos(2πk/64)−j sin(2πk/64). The coefficients are preliminarily computed and stored in the ROM 136. For example, for mode=2, and ROM address ⟨0,1,0,1⟩(=$5_{10}$), it follows that C(0)=C(1)=W(20) and C(2)=C(3)=W(22).

(Lane Swap)

Figure 25:
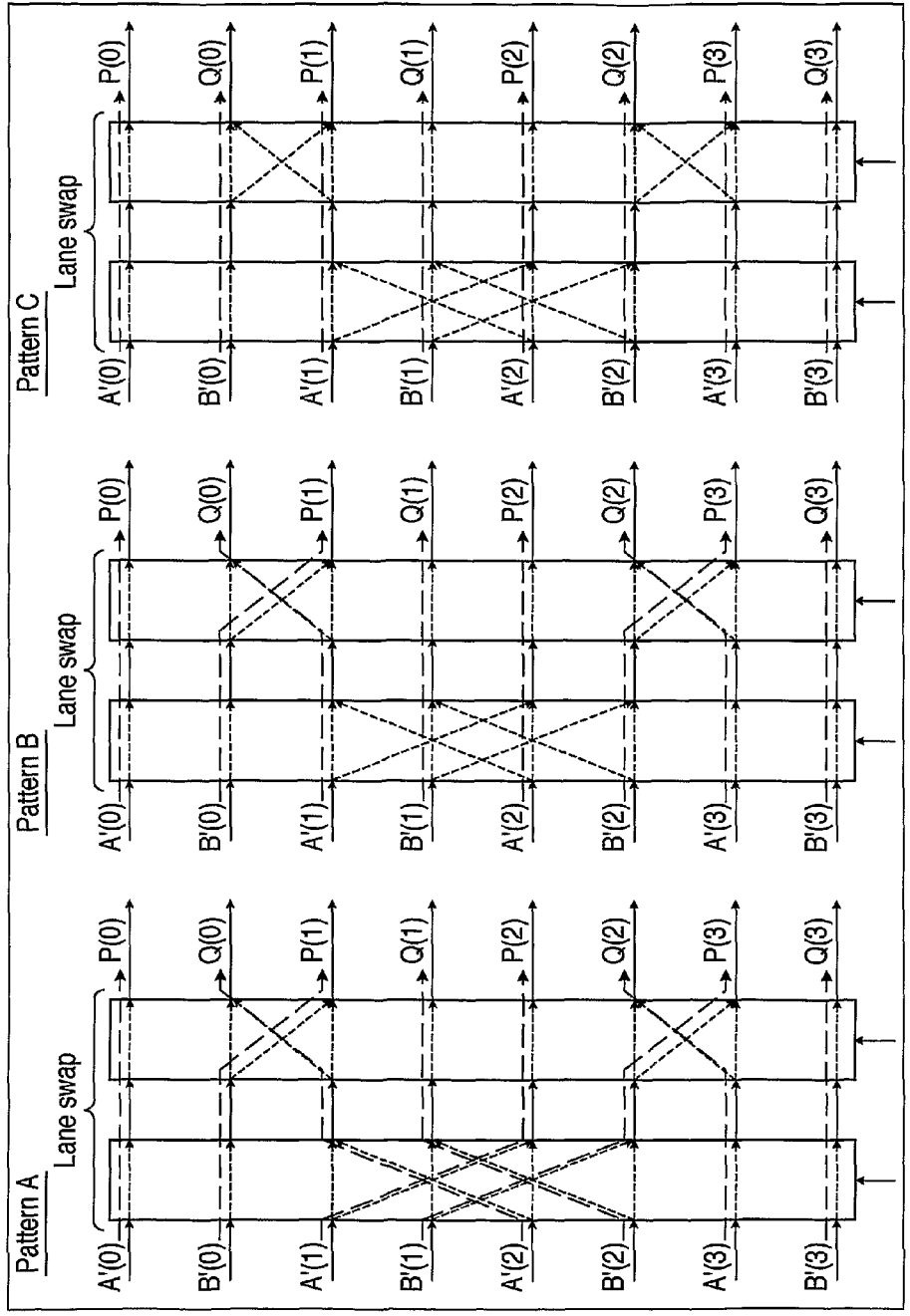
FIG. 25 illustrates an example of data flow for lane swap circuit.
Figure 27:
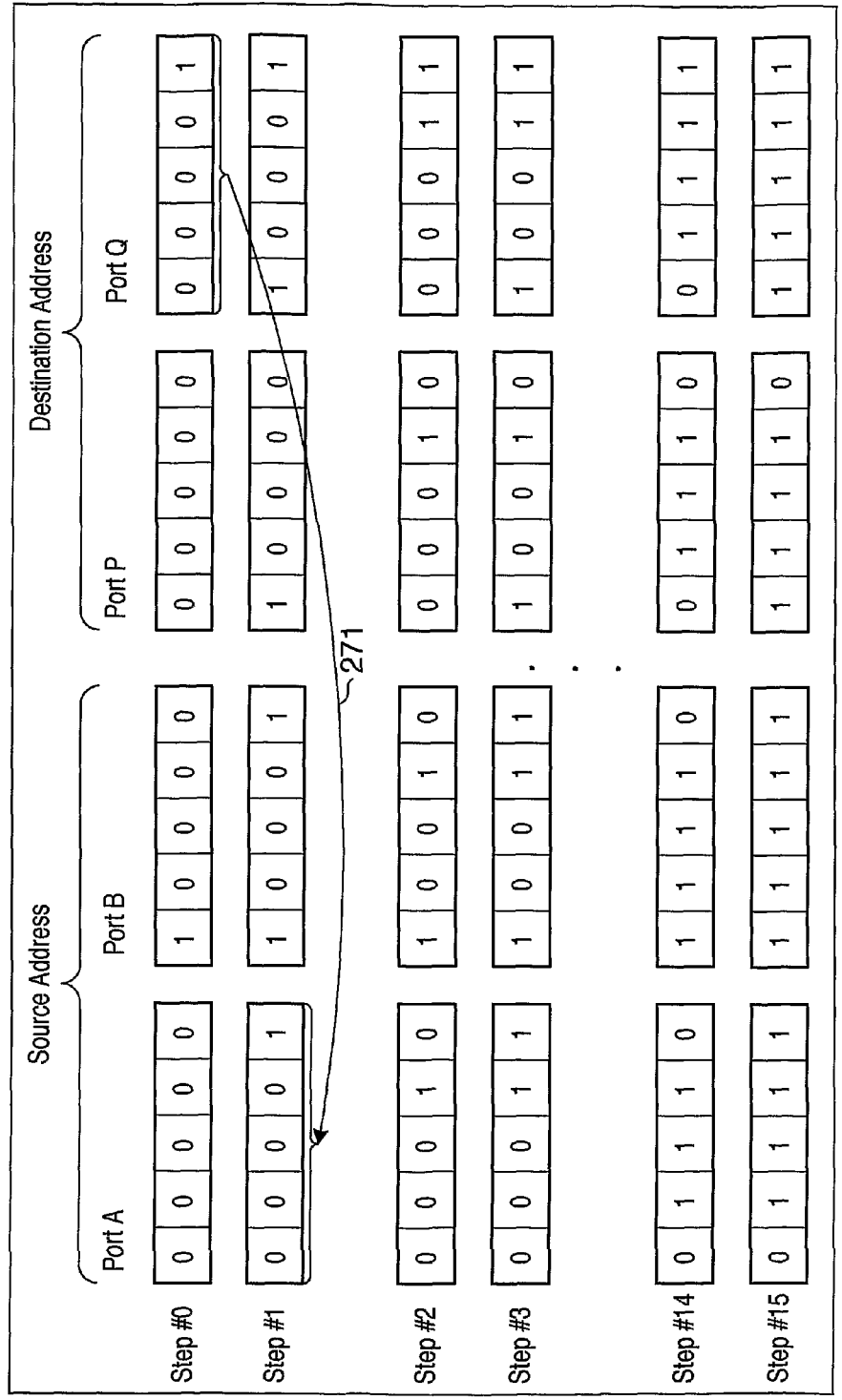
FIG. 27 schematically shows a memory write operation that is executed after a memory read operation.
Figure 39:
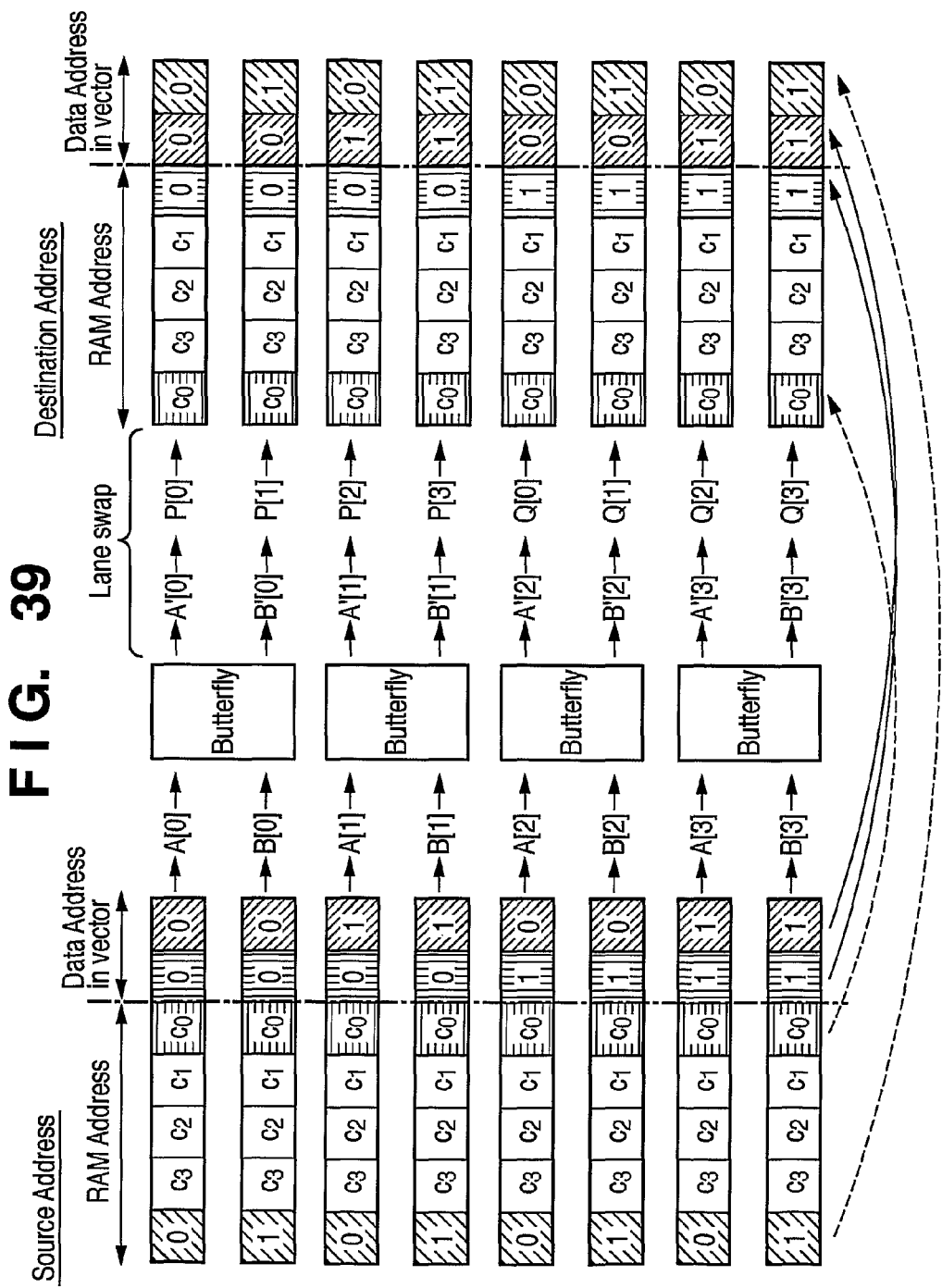
FIG. 39 depicts a bit-swap and a lane-swap for Stage #0.

In stage #0, the lane swap pattern A in FIG. 24 and FIG. 25 is selected. This operation is executed for moving the source address bit #0 to destination address bit #1, bit #1 to bit #2, bit #2 to bit #6, and bit #6 to bit #0 respectively as in FIG. 26. For step #2n, ⟨$c_3,c_2,c_1$⟩=n and $c_0$=0 in FIG. 39, A[0], A[1], A[2], A[3], B[0], B[1], B[2], and B[3] are read from MEM[2n] [0], MEM[2n] [1], MEM[2n] [2], MEM[2n] [3], MEM[2n+16] [0], MEM[2n+16] [1], MEM[2n+16] [2], and MEM[2n+16] [3] of the RAM 120, respectively. After the butterfly operations, A'[0], B'[0], A'[1], B'[1], A'[2], B'[2], A'[3], and B'[2] are routed as P[0], P[1], P[2], P[3], Q[0], Q[1], Q[2], and Q[3], and are stored in MEM[2n] [0], MEM[2n] [1], MEM [2n] [2], MEM[2n] [3], MEM[2n+1] [0], MEM MEM[2n+1] [1], MEM[2n+1] [2], and MEM[2n+1] [3], respectively. For step #2n+1, ⟨$c_3,c_2,c_1,c_0$⟩=⟨0,0,0,1⟩ in FIG. 39, A[0], A[1], A[2], A[3], B[0], B[1], B[2], and B[3] are read from MEM [2n+1][0], MEM[2n+1][1], MEM[2n+1] [2], MEM[2n+1] [3], MEM[2n+17] [0], MEM[2n+17][1], MEM[2n+17][2], and MEM[2n+17][3] of the RAM 120, respectively. After the butterfly operations, A'[0], B'[0], A'[1], B'[1], A'[2], B'[2], A'[3], and B'[2] are routed as P[0], P[1], P[2], P[3], Q[0], Q[1], Q[2], and Q[3], and stored in MEM[2n+16][0], MEM [2n+16] [1], MEM[2n+16] [2], MEM[2n+16] [3], MEM[2n+17] [0], MEM[2n+17] [1], MEM[2n+17] [2], and MEM[2n+17] [3], respectively. Note that the memory write operation in step #2n is performed after the memory read operation in step #2n+1, and n=0,1,2, . . . ,7, as is schematically shown in FIG. 27.

Figure 40:
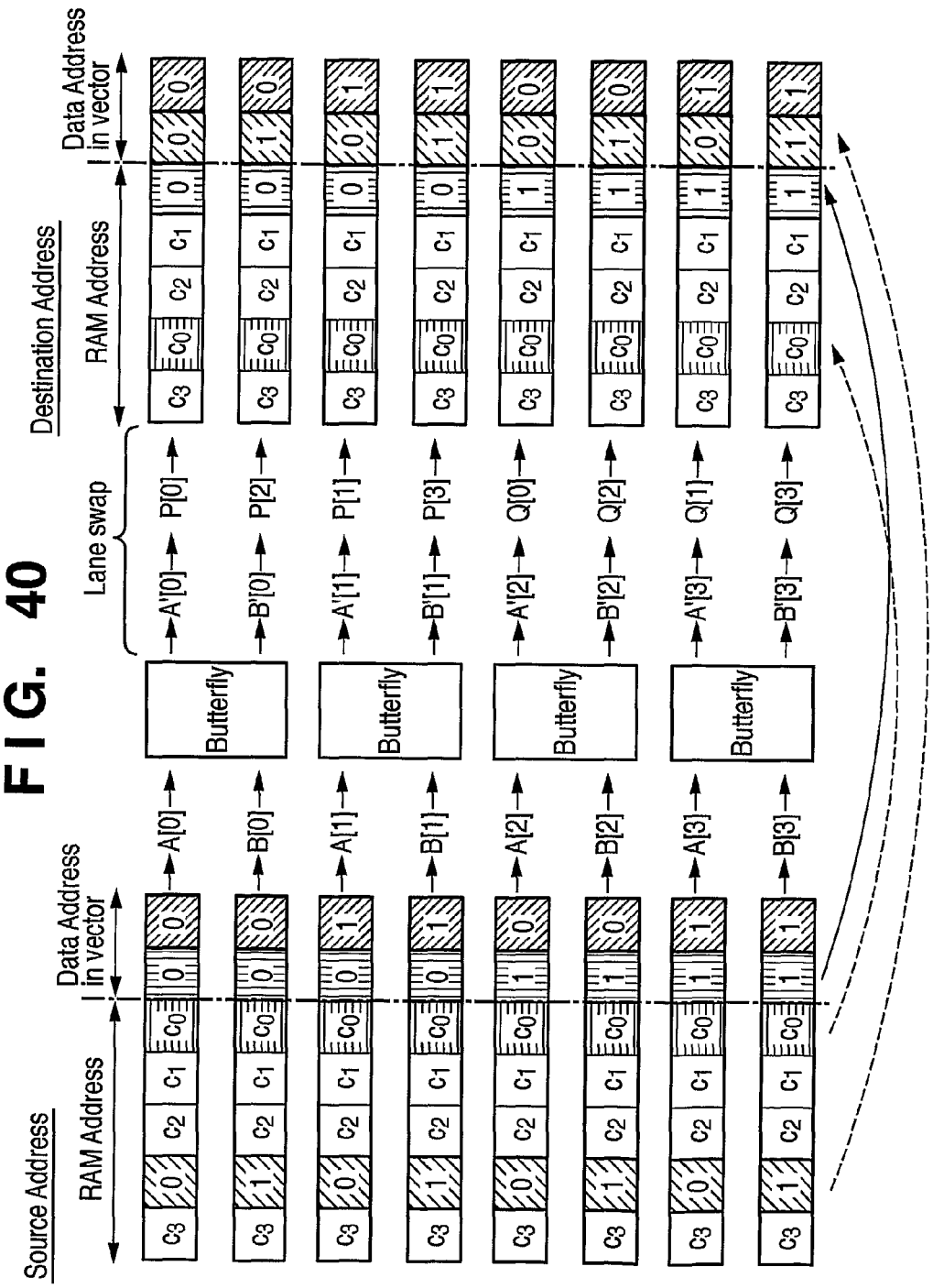
FIG. 40 depicts a bit-swap and a lane-swap for Stage #1.

In stage #1, the lane swap pattern B in FIG. 24 and FIG. 25 is selected. This operation is for moving the source address bit #1 to bit #2, bit #2 to bit #5, and bit #5 to bit #1, respectively, as in FIG. 19. For step #2n, ⟨$c_3,c_2,c_1$⟩=n and $c_0$=0 in FIG. 40, A[0], A[1], A[2], A[3], B[0], B[1], B[2], and B[3] are read from MEM[2n] [0], MEM[2n] [1], MEM[2n] [2], MEM[2n]

[3], MEM[2n+8] [0], MEM[2n+8] [1], MEM[2n+8] [2], and MEM[2n+8][3] of the RAM 120, respectively. After the butterfly operations, A'[0], A'[1], B'[0], B'[1], A'[2], A'[3], B'[3], and B'[2] are routed as P[0], P[1], P[2], P[3], Q[0], Q[1], Q[2], and Q[3], and stored in MEM[2n][0], MEM[2n][1], MEM[2n][2], MEM[2n][3], MEM[2n+1][0], MEM[2n+1] [1], MEM[2n+1][2], and MEM[2n+1][3] of the RAM 120, respectively. For step #2n+1,⟨$c_3,c_2,c_1$⟩=n and $c_0$=1 in FIG. 40, A[0], A[1], A[2], A[3], B[0], B[1], B[2], and B[3] are read from MEM[2n+1] [0], MEM[2n+1] [1], MEM[2n+1] [2], MEM[2n+1] [3], MEM[2n+9] [0], MEM[2n+9] [1], MEM [2n+9] [2], and MEM[2n+9] [3] of the RAM 120, respectively. After the butterfly operations, A'[0], A'[1], B'[0], B'[1], A'[2], A'[3], B'[3], and B'[2] are routed as P[0], P[1], P[2], P[3], Q[0], Q[1], Q[2], and Q[3], and stored in MEM[2n+8] [0], MEM[2n+8] [1], MEM[2n+8] [2], MEM[2n+8] [0], MEM[2n+9] [0], MEM[2n+9] [1], MEM[2n+9] [2], and MEM[2n+9] [3], respectively. Note that the memory write operation in step #2n is performed after the memory read operation in step #2n+1, and n=0,1,2, . . . ,7, as is schematically shown in FIG. 27.

In the rest of stages, the lane swap pattern C in FIG. 24 and FIG. 25 is selected and the lane swap is not performed.

(Processing Flow)

FIG. 28 shows an overall processing flow of the FFT operation that is executed by the FFT apparatus 100. FFT operation consists of 7 stages, and one stage is executed in 16 steps. The processing in S151, S152, S156, S157, S158, and S159 are executed in order to realize this two-dimensional loop.

In S151, a stage identifier is initialized by being set to 0. Next, a step identifier is initialized by being set to 0 in S152.

In S153, the data A and B to be processed is fetched from the RAM 120, and the set of coefficients C is fetched from the ROM 136. In S154, the butterfly operation is performed using these data A, B and coefficients C. The resultant data of the butterfly operation is set to P, and Q. In S155, the results P and Q are written to the RAM 120. In S156, the step identifier is incremented by 1. Next, it is determined whether or not the step identifier is equal to 16 in S157. If it is determined that the step identifier is equal to 16, the process moves to S158, and otherwise returns to S153.

In S158, the stage identifier is incremented by 1. Next, it is determined whether or not the stage identifier is equal to 7 in S159. If it is determined that the stage identifier is equal to 7, the process finishes, and otherwise it returns to S152.

The radix-2 butterfly operations are performed N/2 times in one stage and we repeat this for $\log_2$ N stages. Therefore, this method requires $$\frac{N \log_2 N}{2} = O(N \log N)$$

butterfly operations. The bit-reverse operations are implicitly performed during the butterfly operations and extra calculation time for the bit-reverse operation is not required, the same as with the Stockham algorithm.

The Stockham algorithm requires double the buffer space in order to not destroy the source data before processing. In contrast, according to the present invention, at most only two RAM address bits are changed by the bit-swap, as in FIG. 17 or FIG. 18. That is to say that only two bits are different between the source and destination RAM addresses. The FFT apparatus 100 reads two vectors from the RAM 120, where the RAM addresses correspond to all combinations of these two bits, before writing the result. Accordingly, the FFT apparatus according to the present invention does not destroy the source data before processing, nor while performing the bit-swap operations, allowing it to reduce the amount of RAM required by half as compared with the Stockham autosort algorithm. Further, as shown in FIG. 14, the FFT apparatus according to the present invention performs a plurality of butterfly operations in parallel.

<Second Embodiment>

Figure 29:
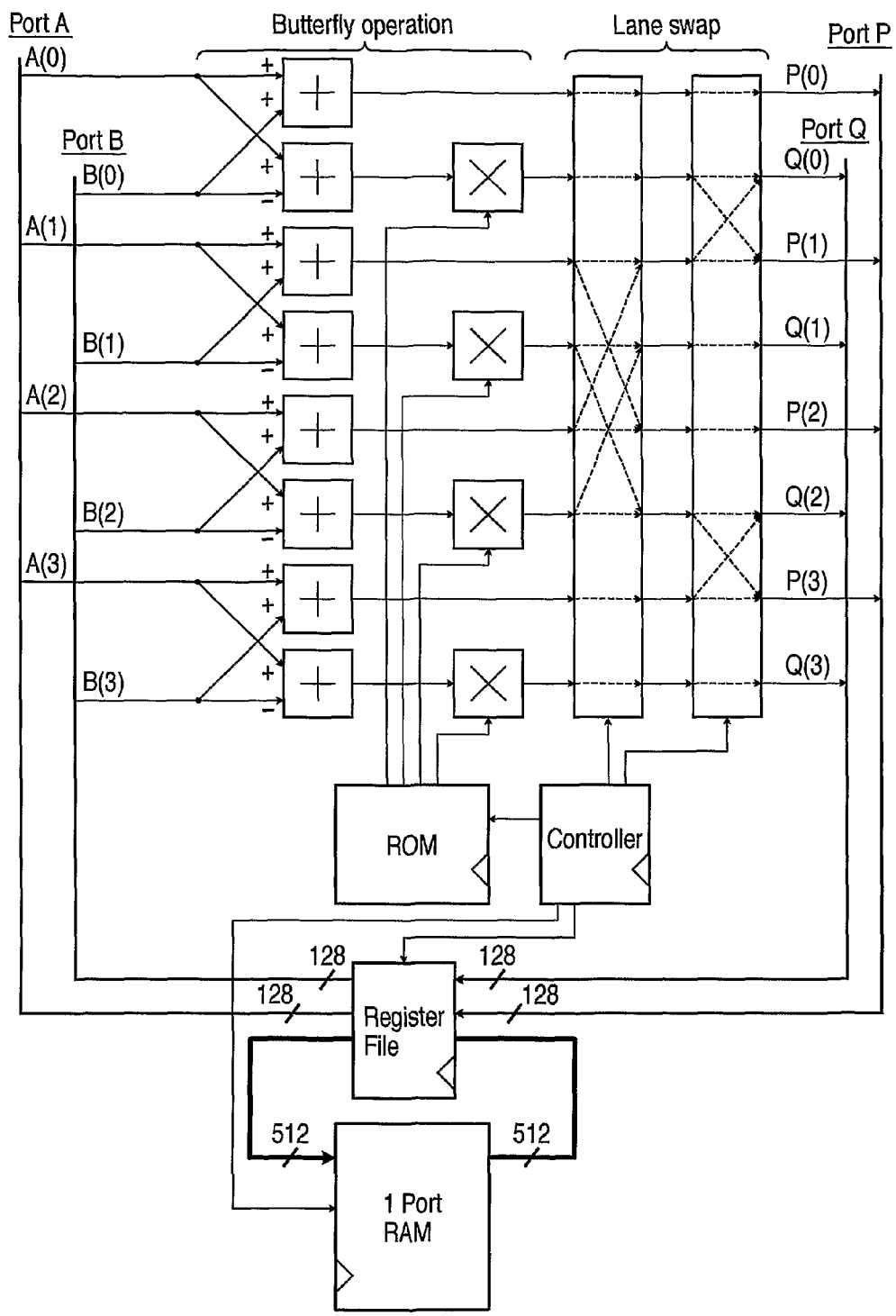
FIG. 29 illustrates another exemplified hardware configuration of a Fast Fourier Transformation apparatus.

The 2 Read+2 Write Port RAM in FIG. 14 may be replaced with a single port RAM with four times the width, as in FIG. 29. FIG. 29 shows an FFT apparatus that executes a RAM access scheme with a single port RAM. In stage #3, the RAM access pattern B is used, and in other stages the RAM access pattern A is used.

Figure 30:
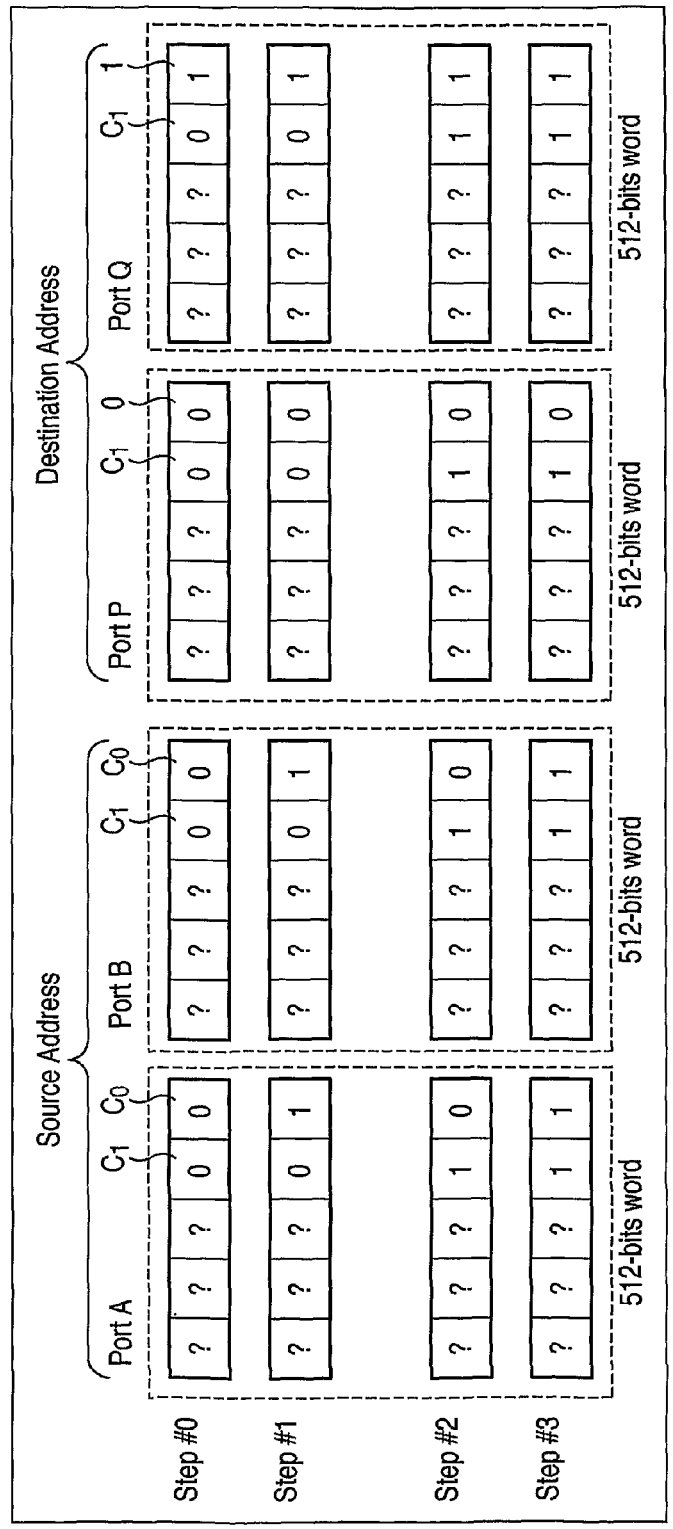
FIG. 30 illustrates a memory access scheme with a single port RAM.

In the RAM access pattern A, which is shown in FIG. 30, four source data for steps #4n, #4n+1, #4n+2, and #4n+3 for either port A or B may be fetched by one RAM read access, or four result data for step #4n, #4n+1, #4n+2, and #4n+3 for either port P or Q may be stored by one RAM write access, where n=0,1,2,3. For example, let us consider steps #0, #1, #2, and #3. MEM[0], MEM[1], MEM[2], and MEM[3] for port A are fetched in one cycle using 1 Port RAM. MEM[16], MEM[17], MEM[18], and MEM[19] for port B are fetched in another cycle. The result data for port P may be stored in MEM[0], MEM[1], MEM[2], and MEM[3] in another cycle. The result data for port Q may be stored in MEM[16], MEM[17], MEM[18], and MEM[19] in another cycle. Steps #0, #1, #2, and #3 may be performed in 4 cycles with 1 Port RAM, which is the same performance as 2 Read+2 Write Port RAM.

Figure 31:
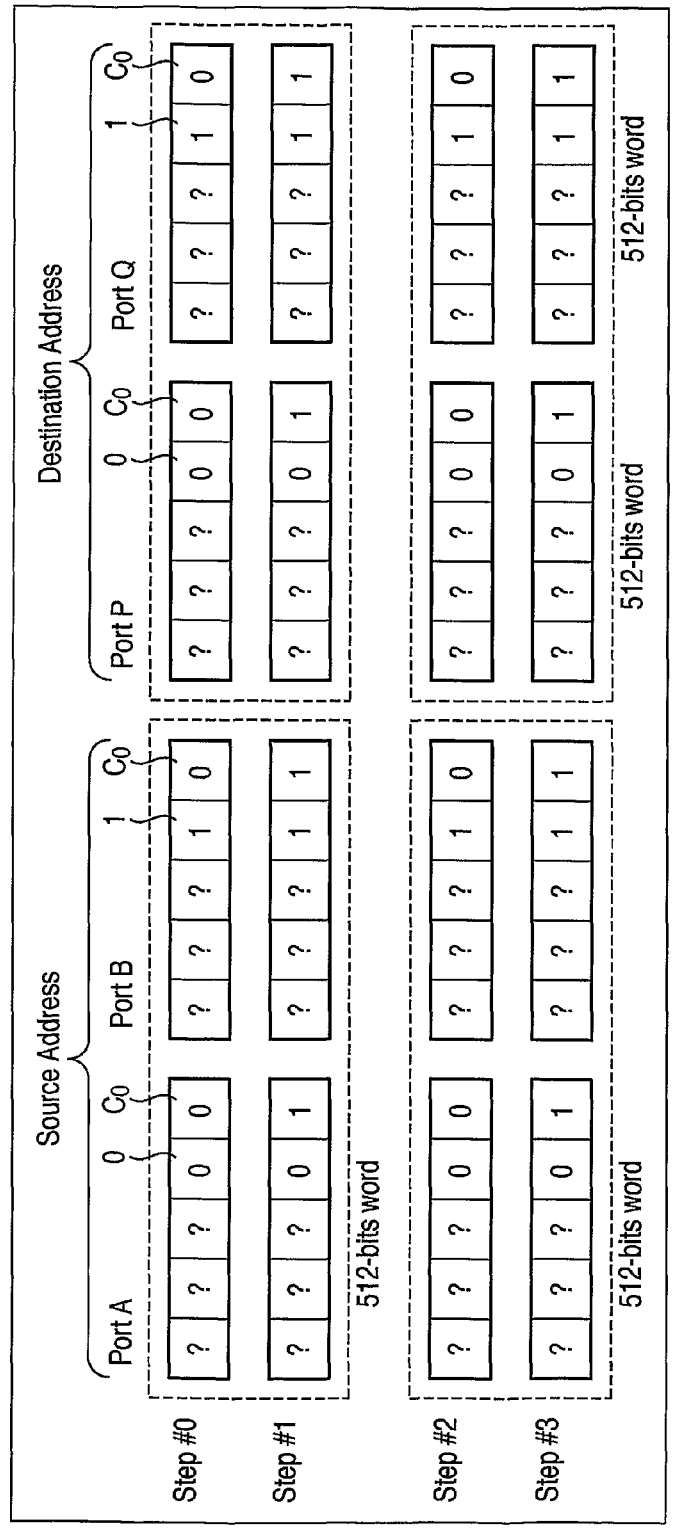
FIG. 31 illustrates a memory access scheme with a single port RAM.

In the RAM access pattern B, which is shown in FIG. 31, four source data for steps #2n and #2n+1 for both ports A and B may be fetched in one RAM read access, or four result data for steps #2n and #2n+1 for both ports P and Q may be stored in one RAM write access, where n is any integer from 0 to 7. For example, let us consider steps #0 and #1. MEM[0] and MEM[1] for port A, and MEM[2] and MEM[3] for port B are fetched in one cycle using 1 Port RAM. The result data for port P are stored as MEM[0] and MEM[1], and the result data for port Q are stored as MEM[2] and MEM[3] in another cycle. Step #0 and #1 may be performed in 2 cycles with 1 Port RAM, which is the same performance as 2 Read+2 Write Port RAM.

As mentioned above, four RAM accesses may be merged into one RAM access using 4 times the width of the RAM. Performance is not lost even when replacing 2 Read+2 Write Port RAM with 1 Port RAM with four times the width. Rather, the bit cost of multi-port RAM is more expensive than 1 Port RAM, since multiple wires need to be routed to a bit cell for simultaneous access. Therefore, replacing 2 Read+2 Write Port RAM with 1 Port RAM can reduce the cost of the RAM.

We can consider a 1 Port RAM and register file as a virtual 2 Read+2 Write Port RAM, since the butterfly operations are performed in the same order as in the first embodiment. The FFT apparatus according to this embodiment requires a temporary buffer (or pipeline registers) to store only four vectors, as in the first embodiment, in addition to the registers to merge four RAM accesses.

<Third Embodiment>

The method described in the previous embodiments may be expanded to a general radix FFT. In the third embodiment, an FFT apparatus performs an FFT operation for a general radix where the same radix is used for all stages.

FIG. 34 illustrates a bit-swap operation for the Radix-3 FFT. In this embodiment, the RAM address is represented as a ternary (base-3) number. The FFT apparatus according to this embodiment uses vectors whose vector size, that is the number of data elements included in one vector, is $3^2=9$. The bit-swap operation is expanded to digit-swap in ternary. As shown in FIG. 34, we may apply the similar algorithm to that in FIG. 15 to determine the digit-swap pattern in this embodiment.

In the same way as in the first embodiment, only two digits in as a the ternary number ($p_{f-v}$ and $p_f$ if $0 \leq s \leq v=1$ else $p_{f-v}$ and $p_0$) in the RAM address are swapped in one stage in this embodiment. The remaining digits may be moved to the loop index. That is, the FFT apparatus according to this embodiment performs the butterfly operation for all $\langle p_{R-v-1}, \ldots, p_{f-v+1}, p_{f-v-1}, \ldots, p_1 \rangle \in \{0, 1, \ldots, 3^{R-v-2}-1\}$ if $0 \leq s \leq v-1$ else for all $\langle p_{R-v-1}, \ldots, p_{f-v+1}, p_{f-v-1}, \ldots, p_{s-r+1}, p_{s-r-1} \ldots, p_0 \rangle \in \{0, 1, \ldots, 3^{R-v-2}-1\}$. In each stage, the FFT apparatus according to this embodiment reads the vector from the RAM for eight combinations, $\langle p_{f-v}, p_0 \rangle \in \{0,1,2,3,4,5,6,7\}$ if $0 \leq s \leq v-1$ else $\langle p_{f-v}, p_{s-v} \rangle \in \{0,1,2,3,4,5,6,7\}$, then performs the butterfly operation, and stores its resultant data to the RAM where these two digits in the address are swapped. In this embodiment, the FFT apparatus requires a temporary buffer in the register file (or pipeline registers in functional elements of FFT apparatus) for the butterfly operation to store eight vectors. It is possible to use the merge scheme of RAM accesses as in the second embodiment for using 1 Port RAM with wide width, and this requires some additional registers in the register file.

According to the FFT apparatus of this embodiment, it is possible to implement an efficient FFT algorithm with a small memory using a RAM with ternary (base-3) addressing.

<Fourth Embodiment>

In the fourth embodiment, an FFT apparatus performs an FFT operation for the general radix where the radix is the same integer power of 2 for all stages.

FIG. 32 schematically illustrates a bit-swap operation for radix-4 FFT by merging two stages. In this case, there exist two butterfly bits in one stage, and at most three address bits are shuffled. As the basic operation, the FFT apparatus fetches sixteen vectors from the memory (RAM), performs the butterfly operations for the fetched vectors, and stores its at most resultant sixteen vectors to the memory. Accordingly, it is not necessary for the FFT apparatus to comprise double the memory. By using a higher radix, it is possible to reduce the number of RAM accesses as well as the number of stages, and the processing time.

The general radix FFT hardware may be constructed with a single port RAM, as shown in FIG. 33.

We may consider two bits as a base-4 digit. Only two digits in a base-4 number encoding ($p_{f-v}$ and $p_f$ if $0 \leq s \leq v-1$ else $p_{f-v}$ and $p_0$) in the RAM address are swapped in one stage in this method, and thus we may consider the two digits in the same way as in the third embodiment. In the loop, the FFT apparatus according to this embodiment reads the vector from the RAM for sixteen combinations, $\langle p_{f-v}, p_0 \rangle \in \{0,1,\ldots,4^2-1\}$ if $0 \leq s \leq v-1$ else $\langle p_{f-v}, p_{s-v} \rangle \in \{0,1,\ldots,4^2-1\}$, performs the butterfly operation for the read data, and stores its resultant data in the RAM. In each stage of the operation, these two digits of the address are swapped. The temporary buffer in the register file (or pipeline registers in functional elements of FFT apparatus) is required to store sixteen vectors in addition to the registers for merging four RAM accesses in the register file. The RAM with a binary address may be used by splitting a base-4 digit into binary two bits.

<Fifth Embodiment>

In the fifth embodiment, an FFT apparatus performs an FFT operation for a mixed radix, that is a product of a power-of-two number and a few other prime numbers.

If the FFT size, that is the number of data elements to be processed, is a multiple of $2^{2V}$, it is easy to perform the vector calculation with the size of $2^i (i \leq V)$ where $2^V$ is the vector size, that is the number of data elements included in one vector.

FIG. 38 shows an example of a bit-swap operation where the FFT size is $240 = 2^4 \cdot 5 \cdot 3$ and the vector size is 4. The address must be represented with a mixed base number where two most significant digits and two least significant digits are symmetrically assigned using a base-2 number.

As shown in FIG. 38, the digit-swap operation for a mixed radix is also executed in accordance with the algorithm shown in FIG. 15. After executing all the steps of the digit-swap operation, the two most significant digits are moved to the two least significant digits, and this fits the vector operation.

LTE (Long Term Evolution) requires an FFT for the mixed radix, which is a product of a power-of-two number and a few other prime numbers. Accordingly, the FFT apparatus according to this embodiment is preferably applied to the LTE.

In the same way as the third embodiment, only two digits as a mixed base number ($p_{f-v}$ and $p_{s-v}$ if $0 \leq s \leq v-1$ else $p_{f-v}$ and $p_0$) in the RAM address are swapped in one stage in this method. In the loop, in stage #2 which requires a buffer of maximum size, reading the vector from the RAM for all $\langle p_1, p_0 \rangle \in \{0, 1, \ldots, 2\cdot 5 - 1\}$, and storing it in the RAM after the calculation, where these two digits in the address are swapped. The FFT operation according to this embodiment requires a temporary buffer (or pipeline registers) to store ten vectors in addition to the registers for merging four RAM accesses.

The FFT apparatus may use a RAM with a binary addressing by converting the address in a mixed base number to a binary number. For example, the RAM address after stage #1 is given by computing $30d_2 + 15d_1 + 3d_3 + d_0$ in binary where $d_0, d_1, d_2$ or $d_3$ are represented in binary with certain bits. The FFT apparatus requires a RAM which can store 360 complex elements, the number of which is 1.5 times the number of the complex elements. This is because MSD may be a ternary number during the process, while the original MSD is a binary number. It should be noted that this is a small amount of memory as compared with the memory size required for the Stockham autosort algorithm.

<Sixth Embodiment>

In the sixth embodiment, an FFT apparatus performs an FFT operation for the mixed radix without using the alignment of vector and butterfly operations.

When all radixes in the FFT are 3, the RAM is addressed with a ternary (base 3) number, and the vector size is 3n. In this case, the process is straightforward. The FFT apparatus may perform mixed digit-swap for data encoded in a ternary number (instead of bit-swap), as shown in FIG. 34. When a mixed radix with a different integer is used, it is also possible to expand the invented algorithm.

Figure 35:
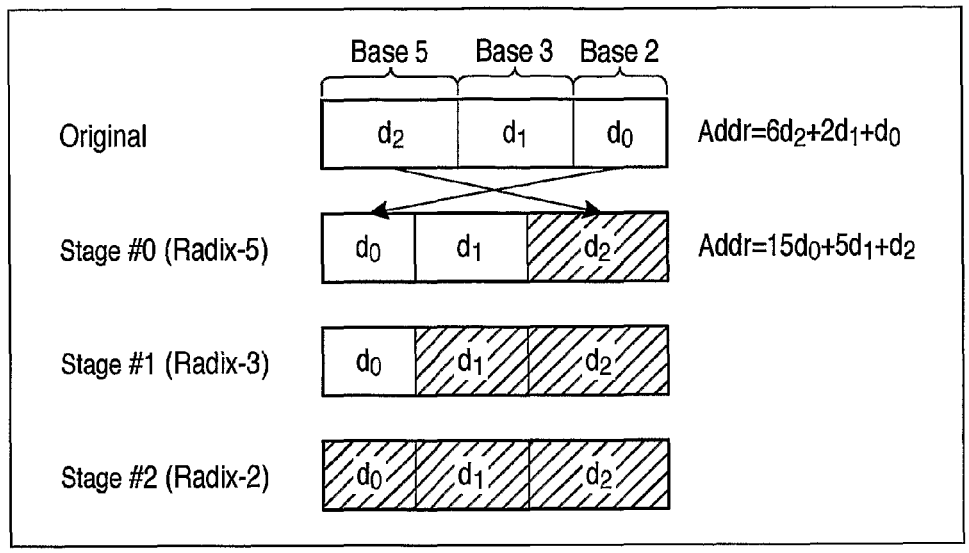
FIG. 35 illustrates an example of swapping operations according to an embodiment of the present invention.
Figure 36:
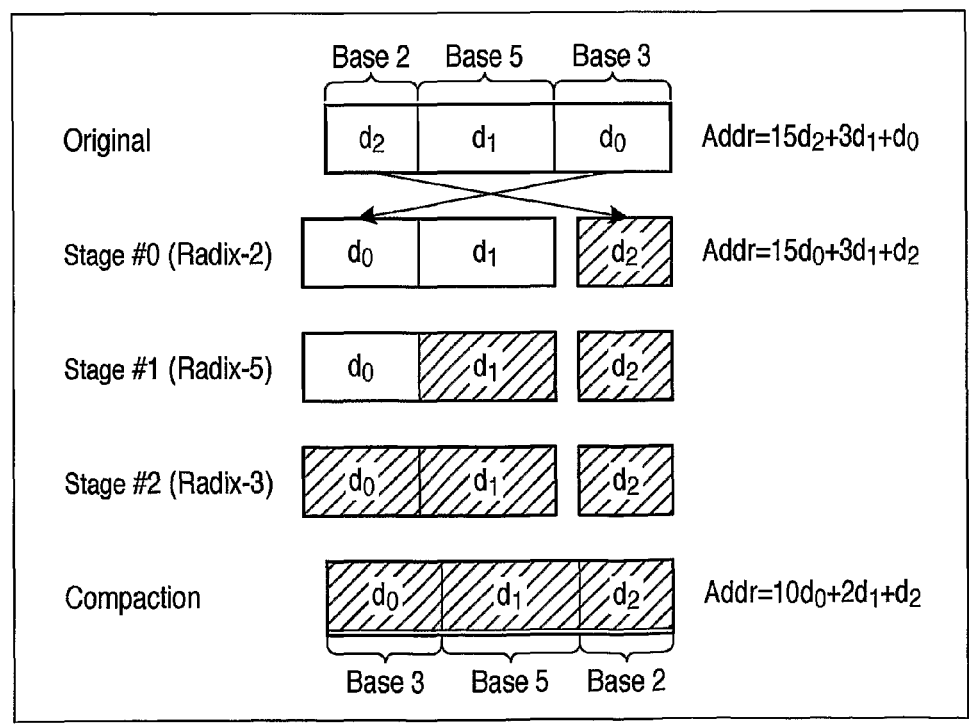
FIG. 36 illustrates an example of swapping operations according to an embodiment of the present invention.

In method-1 (FIG. 35), it is necessary to use double the size of the calculation data of memory. In method-2 (FIG. 36), the FFT apparatus may perform the calculation with 1.5 times the memory, but it is necessary to perform compaction (shifting the data) at the final stage.

The algorithm for one stage without considering the alignment of vector is as follows. The following algorithm is repeated for all stages:

1) The FFT apparatus reads pq complex elements from the RAM for all integers i,j ($1 \leq i \leq p$, $1 \leq j \leq q$) as $D_{i,j} = D[A + (i-1)B + (j-1)]$, where A is zero or a positive integer which is determined for each operation step, B is an integer which is larger than one and is determined for each stage, p is an integer which is a radix number of butterfly operations to be performed in this stage.

2) The FFT apparatus performs radix-p butterfly operation on sets of the data elements $\{D_{i,j} | 1 \leq i \leq p\}$ for each j ($1 \leq j \leq q$) to compute sets of result data $\{Q_{i,j} | 1 \leq i \leq p\}$.

3) The FFT apparatus writes the result data $Q_{i,j}$ into the RAM as $D[A + (j-1)B + (i-1)] = Q_{i,j}$ when digit-swap is performed in the stage. If digit reverse is not performed, the result data is stored to the original address as $D[A + (i-1)B + (j-1)] = Q_{i,j}$.

Figure 37:
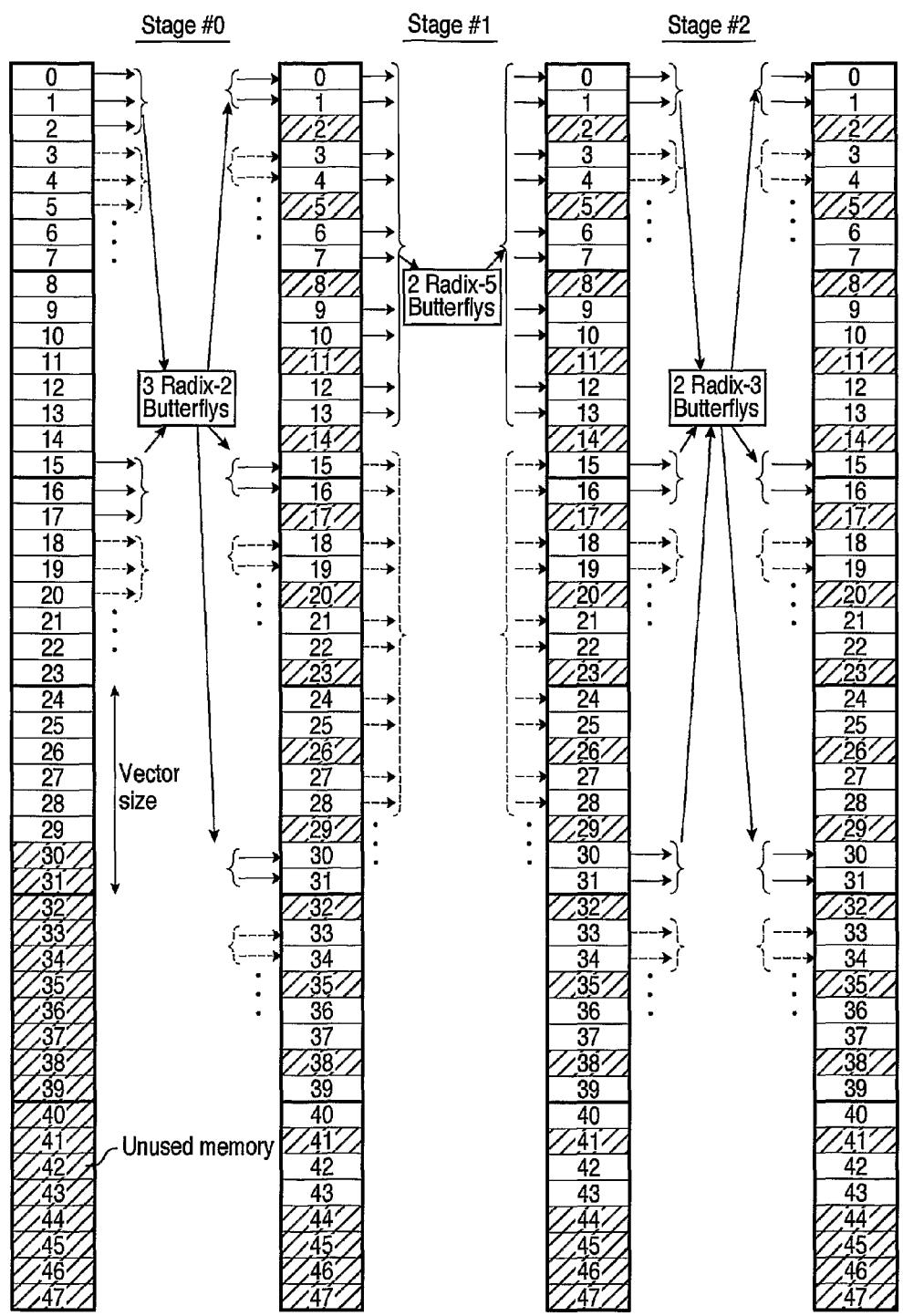
FIG. 37 depicts vector memory accesses for a Fast Fourier Transform with mixed radixes.

An example of memory accesses and butterfly operations for mixed radix of 2, 5 and 3 is shown in FIG. 37.

At stage #0, the FFT apparatus performs three radix-2 butterfly operations as a unit operation in parallel (or sequential if it cannot be parallelized), which corresponds to the digit-swap (radix-2 comes from d2, and radix-3 comes from base-3 or radix-3 for d0). That is, p=2,q=3,B=3, and the result is stored to the RAM as $D[A + (j-1)B + (i-1)] = Q_{i,j}$.

At stages #1, the digit-swap is not performed and the FFT apparatus performs the 2 butterfly operations, since d2 on the LSD (Least Significant Digit) corresponds to radix-2. That is, p=5,q=2,B=3, and the result is stored to the RAM as $D[A + (i-1)B + (j-1)] = Q_{i,j}$.

At stages #2, the digit-swap is not performed and the FFT apparatus performs the 2 butterfly operations, since d2 on the LSD corresponds to radix-2. That is, p=3,q=2,B=3, and the result is stored to the RAM as $D[A + (i-1)B + (j-1)] = Q_{i,j}$.

By using these unit operations, the memory access may be transformed to several burst accesses as batch processes.

At stage #0, two burst accesses starting from addresses 0 and 15 are generated. The read data D[0] and D[15] are provided to the first radix-2 butterfly operation, and D[1] and D[16] are provided to the second butterfly operations, and so on. The first radix-2 butterfly operation generates the writing data D[0], D[15], and D[30], and the second butterfly operation generates the writing data D[1], D[16], and D[31], and so on. These data are stored to the memory by three burst writing operations starting from address 0, 15, and 30.

At stage #1, one burst access starting from address 0 is generated. The read data D[0], D[3], D[6], D[9], and D[12] are provided to the first radix-5 butterfly operation, and D[1], D[4], D[7], D[9], and D[12] are provided to the second butterfly operations, and so on. The first radix-5 butterfly operation generates the writing data D[0], D[3], D[6], D[9], and D[12], and the second butterfly operation generates the writing data D[1], D[4], D[7], D[9], and D[12], and so on. These data are stored in the memory by one burst writing operation starting from address 0.

At stage #2, three burst accesses starting from address 0, 15 and 30 are generated. The read data D[0], D[15] and D[30] are provided to the first radix-3 butterfly operation, and D[1], D[16], and D[31] are provided to the second butterfly operations, and so on. The first radix-3 butterfly operation generates the writing data D[0], D[15], and D[30], and the second butterfly operation generates the writing data D[1], D[16], and D[31], and so on. These data are stored in the memory by three burst writing operations starting from address 0, 15, and 30.

These burst data could be provided without stalling by allowing alternative access to the wide vector memory and queuing the data.

Figure 41:
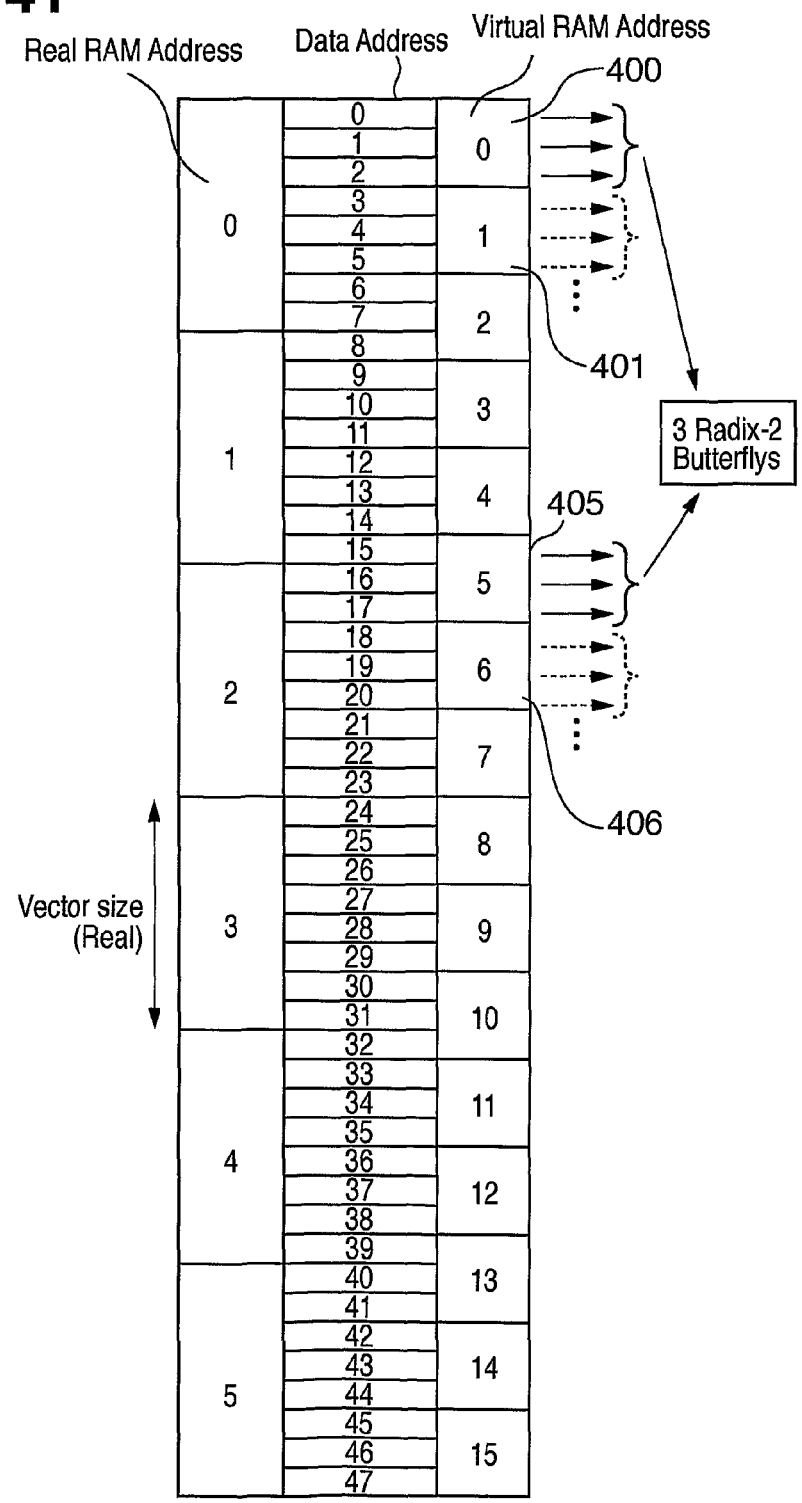
FIG. 41 depicts the relation of virtual RAM addresses and real RAM addresses.

In this method, we consider a virtual RAM where the address may be represented in a variable mixed base number. The addressing scheme and data width may be changed depending on the stage or RAM access type for reading or writing. FIG. 41 depicts the relation of the virtual RAM address and real RAM address for Stage #0 read access.

When we consider the virtual RAM access, it is similar to the fifth embodiment, and only two digits in a mixed base number ($p_{f-v}$ and $p_{s-v}$, or $p_{f-v}$ and $p_0$) in the virtual RAM address are swapped in one stage. Note that v can depend on a stage or RAM access type for reading or writing. In the loop, in a certain stage which requires the maximum buffer, reading the vector from the virtual RAM for all combinations in the above two digits, and storing it in the virtual RAM after the calculation, where these two digits in the address are swapped. The FFT apparatus requires the temporary buffer (or pipeline registers) for this maximum case in the digit-swap.

The above virtual RAM may be constructed with the real RAM with the binary address. However, the binary RAM address does not correspond to a virtual RAM address in a mixed base number. Thus, the FFT apparatus requires to split one access to the virtual RAM into two real RAM accesses as in 405. On the other hand, the data for 401 and 402 can be obtained by one read access to the real RAM. This scheme can be realized with some buffer registers. The FFT apparatus requires a RAM which can store 45 complex elements, which is 1.5 times the number of complex elements. This is because MSD may be a ternary number during the process while the original MSD is a binary number. However, this is a small amount compared with the memory size required with the Stockham autosort algorithm.

As described above, embodiments of the present invention have been described in detail. However, aside from an information processing apparatus, it is possible for the embodiments to involve a method in which a computer executes the above processing or as a program on a storage medium in which the program is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus for performing a radix-2 Fast Fourier Transform (FFT) on a data sequence, the information processing apparatus comprising:

a storage element comprising a plurality of storage areas, each of which stores a plurality of data elements to be processed and is assigned a storage address;

a reading element configured to read from the storage element a plurality of sets, each of which includes the plurality of data elements stored in a same storage area;

a plurality of butterfly operation elements configured to perform butterfly operations with predetermined coefficients respectively on a plurality of data elements, each of said plurality of data elements included in the plurality of sets read from the storage element, to compute a plurality of result data respectively;

a writing element configured to write a set including the plurality of result data into the storage element; and a controller configured to control each of the storage, reading, butterfly operation, and writing elements to perform the butterfly operations on all of the data elements stored in the storage element at every stage of the FFT operation;

wherein each stage of the FFT operation includes a plurality of operation steps, and at every operation step the controller controls each of the storage, reading, butterfly operation, and writing elements so that:

the reading element reads from the storage element a first set of data elements referenced by a first storage address A, a second set of data elements referenced by a second storage address A+1, a third set of data elements referenced by a third storage address $A+2^m$, and a fourth set of data elements referenced by a fourth storage address $A+2^m+1$;

the plurality of butterfly operation elements perform radix-2 butterfly operations on the data elements included in the first set and the data elements included in the third set to compute a first and third set of the result data, and perform radix-2 butterfly operations on the data elements included in the second set and the data elements included in the fourth set to compute a second and fourth set of the result data; and the writing element writes the first set of the result data into the storage area referenced by the first storage address A, writes one of the second and third sets of the result data into the storage area referenced by the second storage address A+1, writes the other of the second and third set into the storage area referenced by the third storage address $A+2^m$, and writes the fourth set of the result data into the storage area referenced by the fourth storage address $A+2^m+1$;

where A comprises zero or a positive integer which is determined for each operation step, and m comprises a positive integer determined for each stage.

2. The information processing apparatus according to claim 1:

wherein the reading element comprises a first holding element for holding the set of the data elements read from the storage element; and wherein the writing element comprises a second holding element for holding the set of the result data.

3. The information processing apparatus according to claim 2:

wherein the reading element comprises a plurality of the first holding elements for each set of the data elements; and the writing element comprises a plurality of the second holding elements for each set of the result data.

4. An information processing apparatus for performing a mixed radix or single radix Fast Fourier Transform (FFT) on a data sequence, the information processing apparatus comprising:

a storage element comprising a plurality of storage areas, each of which stores a plurality of data elements to be processed and is assigned a storage address;

a reading element configured to read from the storage element a plurality of sets, each of which includes the plurality of data elements stored in a same storage area;

a plurality of butterfly operation elements configured to perform butterfly operations with predetermined coefficients respectively on a plurality of data elements, each of said plurality of data elements included in the plurality of sets read from the storage element, to compute a plurality of result data respectively;

a writing element configured to write a set including the plurality of result data into the storage element; and a controller configured to control each of the storage, reading, butterfly operation, and writing elements to perform the butterfly operations on all of the data elements stored in the storage element at every stage of the FFT operation;

wherein each stage of the FFT operation includes a plurality of operation steps, and at every operation step the controller controls each of the storage, reading, butterfly operation, and writing elements so that:

the reading element reads from the storage element data elements $D_{i,j}$ referenced by storage addresses $A+(i-1)B+(j-1)$ for all integers i,j ($1 \leq i \leq p$, $1 \leq j \leq q$);

the plurality of butterfly operation elements perform a radix-p butterfly operation on sets of the data elements $\{D_{i,j}|1 \leq i \leq p|\}$ for each j ($1 \leq j \leq q$) to compute sets of result data $\{Q_{i,j}|1 \leq i \leq p|\}$; and the writing element writes the result data $Q_{i,j}$ into the storage area referenced by either a storage address $A+(j-1)B+(i-1)$ or $A+(i-1)B+(j-1)$;

where A comprises zero or a positive integer determined for each operation step, B comprises an integer larger than one and determined for each stage, p comprises an integer which comprises a radix number of butterfly operations to be performed in each stage and determined for each stage, and q comprises an integer which comprises a radix number of butterfly operations to be performed in one of the stages.

5. A control method of an information processing apparatus for performing a radix-2 Fast Fourier Transform (FFT) on a data sequence, wherein the information processing apparatus comprises a storage element for including a plurality of storage areas, each of which stores a plurality of data elements to be processed and is assigned a storage address, the method comprising:

at a reading element, reading from the storage element a plurality of sets, each of which includes the plurality of data elements stored in a same storage area;

at a performing element, performing butterfly operations with predetermined coefficients respectively on a plurality of data elements, each of said data elements included in the plurality of sets read from the storage element, to compute a plurality of result data respectively;

at a writing element, writing a set including the plurality of result data into the storage element; and at a controller, controlling each of each element of the information processing apparatus to perform the butterfly operations on all of the data elements stored in the storage element at every stage of the FFT operation;

wherein each stage of the FFT operation includes a plurality of operation steps, and at every operation step, each of the elements is controlled so that:

the reading element reads from the storage element a first set of data elements referenced by a first storage address A, a second set of data elements referenced by a second storage address A+1, a third set of data elements referenced by a third storage address $A+2^m$, and a fourth set of data elements referenced by a fourth storage address $A+2^m+1$;

the performing element performs radix-2 butterfly operations on the data elements included in the first set and the data elements included in the third set to compute a first and third set of the result data, and perform radix-2 butterfly operations on the data elements included in the second set and the data elements included in the fourth set to compute a second and fourth set of the result data; and the writing element writes the first set of the result data into the storage area referenced by the first storage address A, writes one of the second and third sets of the result data into the storage area referenced by the second storage address A+1, writes the other of the second and third sets into the storage area referenced by the third storage address $A+2^m$, and writes the fourth set of the result data into the storage area referenced by the fourth storage address $A+2^m+1$;

where A comprises zero or a positive integer determined for each operation step, and m comprises a positive integer determined for each stage.

6. A computer program product stored in a non-transient computer readable medium for controlling a computer, the computer program product comprising software instructions which, when run on the computer, causes the computer to function as an information processing apparatus by:

storing, in each of a plurality of storage areas in a storage element, a plurality of data elements to be processed and is assigned a storage address;

reading, from the storage element, a plurality of sets, each of which includes the plurality of data elements stored in a same storage area;

performing butterfly operations with predetermined coefficients respectively on a plurality of data elements, each of said plurality of data elements included in the plurality of sets read from the storage element, to compute a plurality of result data respectively;

writing a set including the plurality of result data into the storage element; and controlling each of the storage, reading, butterfly operation, and writing steps to perform the butterfly operations on all of the data elements stored in the storage element at every stage of the FFT operation;

wherein each stage of the FFT operation includes a plurality of operation steps, and at every operation step the storage, reading, butterfly operation, and writing steps are controlled so that:

a first set of data elements referenced by a first storage address A is read from the storage element, a second set of data elements referenced by a second storage address A+1 is read from the storage element, a third set of data elements referenced by a third storage address $A+2^m$ is read from the storage element, and a fourth set of data elements referenced by a fourth storage address $A+2^m+1$ is read from the storage element;

a radix-2 butterfly operation on the data elements included in the first set and the data elements included in the third set is performed to compute a first and third set of the result data, and a radix-2 butterfly operation on the data elements included in the second set and the data elements included in the fourth set is performed to compute a second and fourth set of the result data; and the first set of the result data is written into the storage area referenced by the first storage address A, one of the second and third sets of the result data is written into the storage area referenced by the second storage address A+1, the other of the second and third set is written into the storage area referenced by the third storage address $A+2^m$, and the fourth set of the result data is written into the storage area referenced by the fourth storage address $A+2^m+1$;

where A comprises zero or a positive integer which is determined for each operation step, and m comprises a positive integer determined for each stage.

7. A computer program product stored in a non-transient computer readable medium for controlling a computer, the computer program product comprising software instructions which, when run on the computer, causes the computer to function as an information processing apparatus by:

storing, in each of a plurality of storage areas of a storage element, a plurality of data elements to be processed and is assigned a storage address;

reading, from the storage element, a plurality of sets, each of which includes the plurality of data elements stored in a same storage area;

performing butterfly operations with predetermined coefficients respectively on a plurality of data elements, each of said plurality of data elements included in the plurality of sets read from the storage element, to compute a plurality of result data respectively;

writing a set including the plurality of result data into the storage element; and controlling each of the storage, reading, butterfly operation, and writing steps to perform the butterfly operations on all of the data elements stored in the storage element at every stage of the FFT operation;

wherein each stage of the FFT operation includes a plurality of operation steps, and at every operation step the controller controls each of the storage, reading, butterfly operations, and writing steps are controlled so that:

data elements $D_{i,j}$ referenced by storage addresses $A+(i-1)B+(j-1)$ for all integers i,j ($1 \le i \le p$, $1 \le j \le q$) are read from the storage element;

a radix-p butterfly operation on sets of the data elements $\{D_{i,j} | 1 \le i \le p\}$ is performed for each j ($1 \le j \le q$) to compute sets of result data $\{Q_{i,j} | 1 \le i \le p\}$;

the result data $Q_{i,j}$ is written into the storage area referenced by either a storage address $A+(j-1)B+(i-1)$ or $A+(i-1)B+(j-1)$;

where A comprises zero or a positive integer determined for each operation step, B comprises an integer larger than one and determined for each stage, p comprises an integer which comprises a radix number of butterfly operations to be performed in each stage and determined for each stage, and q comprises an integer which comprises a radix number of butterfly operations to be performed in one of the stages.

\* \* \* \* \*

UNITED STATES PATENT AND TRADEMARK OFFICE
CERTIFICATE OF CORRECTION

PATENT NO. : 8,880,575 B2
APPLICATION NO. : 13/514334
DATED : November 4, 2014
INVENTOR(S) : Asanaka Page 1 of 2

It is certified that error appears in the above-identified patent and that said Letters Patent is hereby corrected as shown below:

Specification

In Column 2, Line 52, delete " $x^{(1)}(7)=x(7)+W^0 x(15), x^{(1)}(15)=x(7)-W^0 x(15),$ " and insert -- $x^{(1)}(7)=x(7)+W^0 x(15), \quad x^{(1)}(15)=x(7)-W^0 x(15).$ --, therefor.

In Column 3, Line 54, delete " $x^{(0)}(j,0)=X(j)$ " and insert -- $x^{(0)}(j,0)=X(j),$ --, therefor.

In Column 11, Line 43, delete " $b_0 \rangle |_{b_i=0} \rfloor$ " and insert -- $b_0 \rangle |_{b_i=1} \rfloor$ --, therefor.

In Column 12, Line 43, delete

" $\mathrm{MEM}[\langle p_{R-v-1}, \ldots, p_{f-v}, \ldots, p_0 \rangle |_{p_{f-v}=0, p_0=0}][l]$ " and insert -- $MEM\left[\langle p_{R-v-1}, \ldots, p_{f-v}, \ldots, p_0 \rangle \big|_{p_{f-v}=0, p_0=0}\right][l] = P[l]$ --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,880,575 B2

Claims

In Column 26, Line 7, in Claim 7, delete "$\{D_{i,j} | 1 \leq i \leq p |\}$" and insert --$\{D_{i,j} | 1 \leq i \leq p |\}$--, therefor.